Jan. 19, 1932.   J. H. BENJAMIN   1,841,593
SELF OPERATING TALKING MACHINE
Original Filed Aug. 25, 1921   13 Sheets-Sheet 1
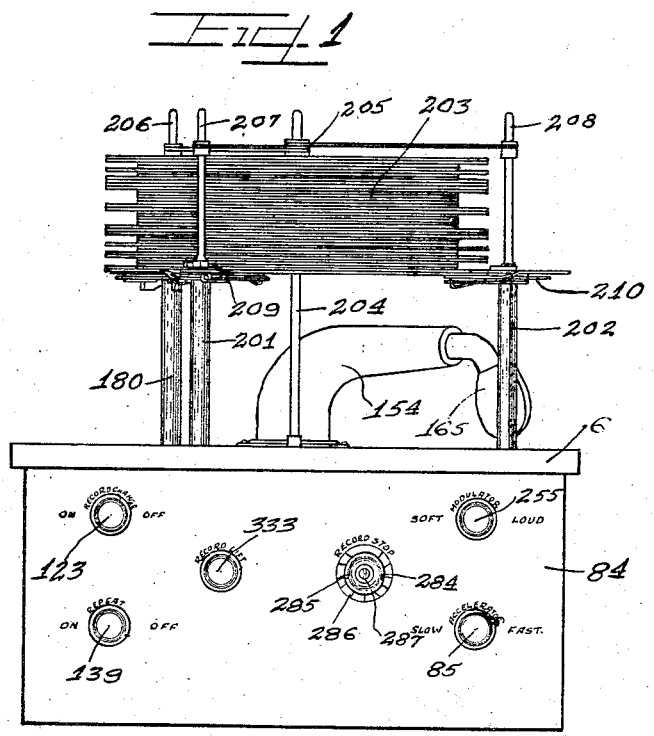
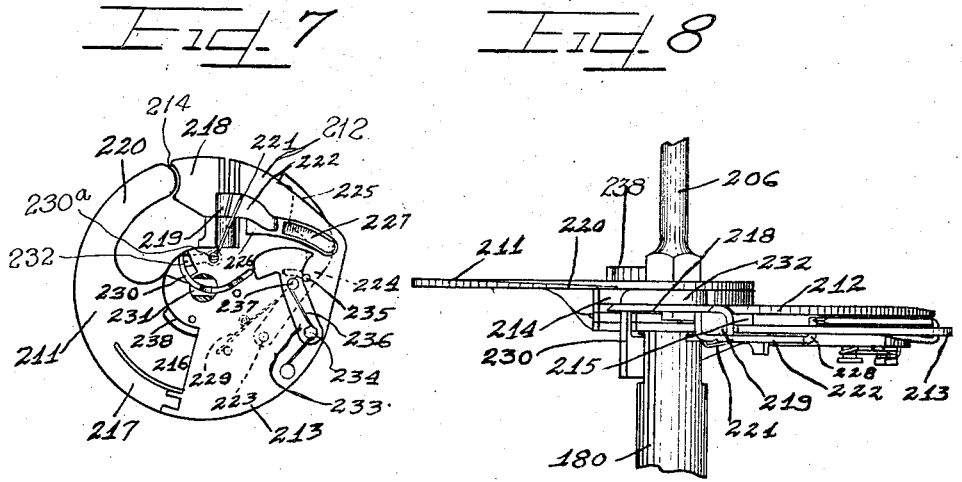

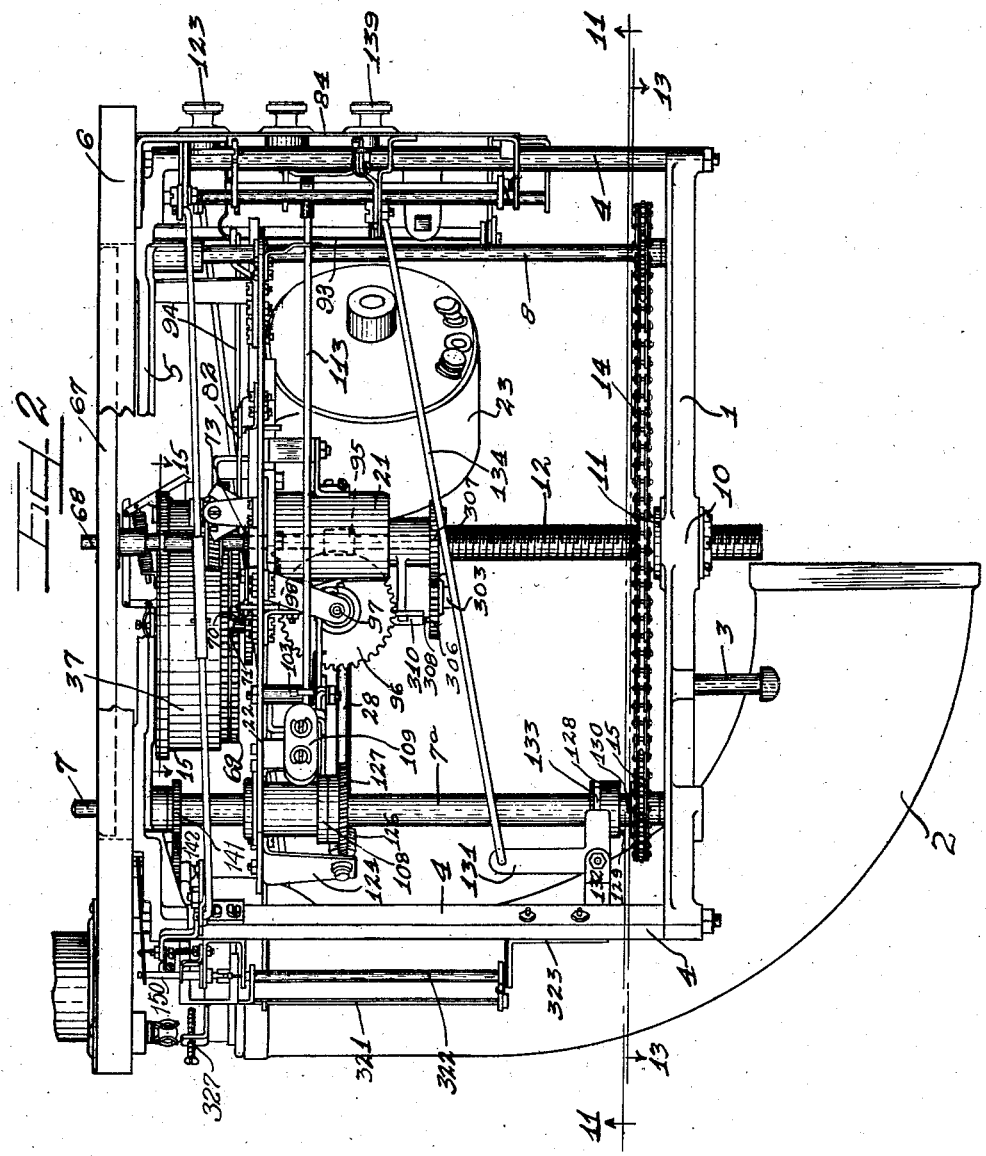

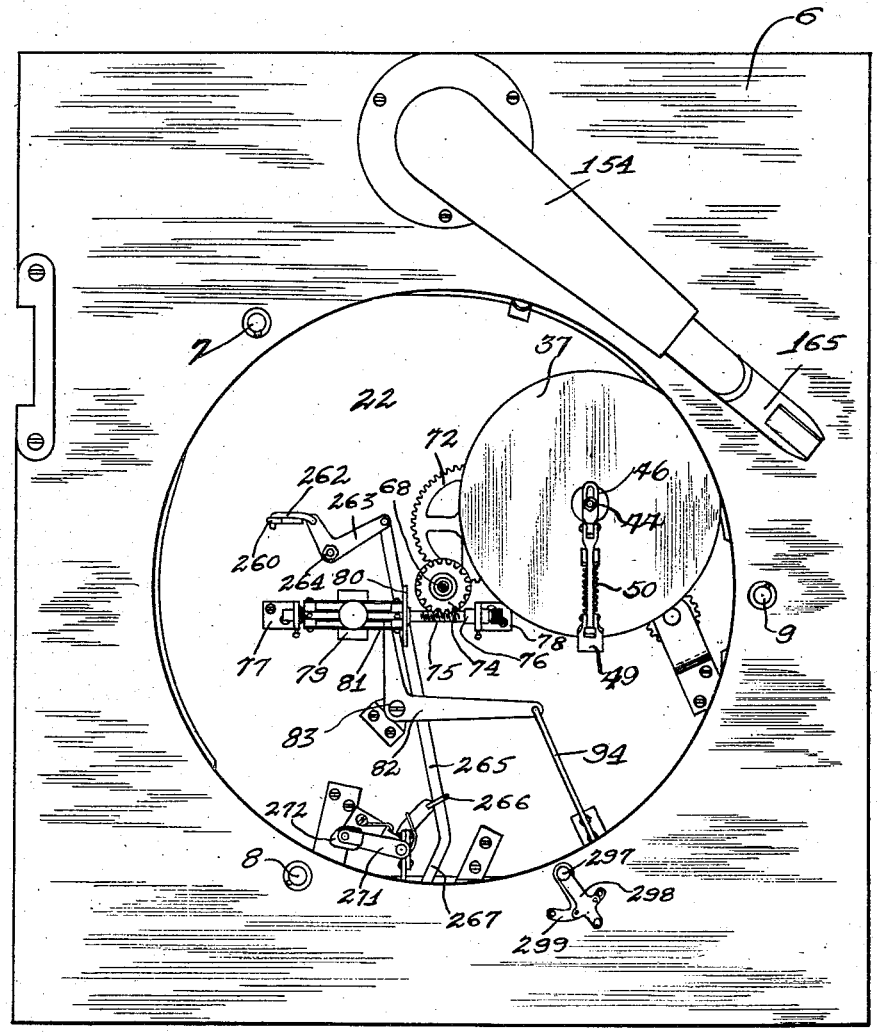

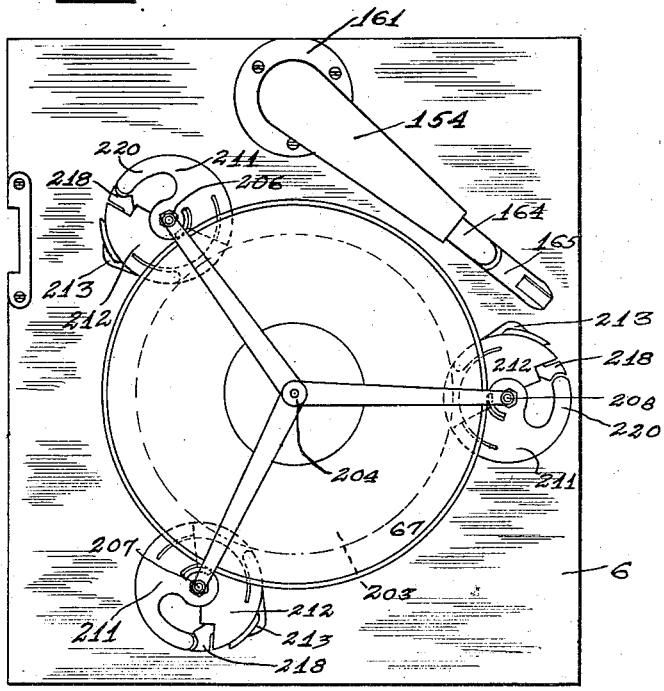
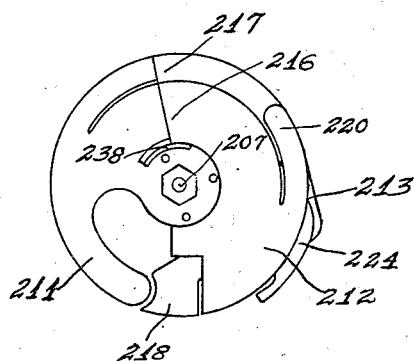
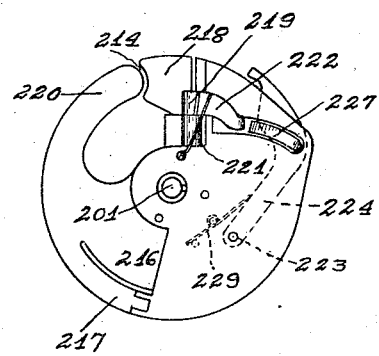

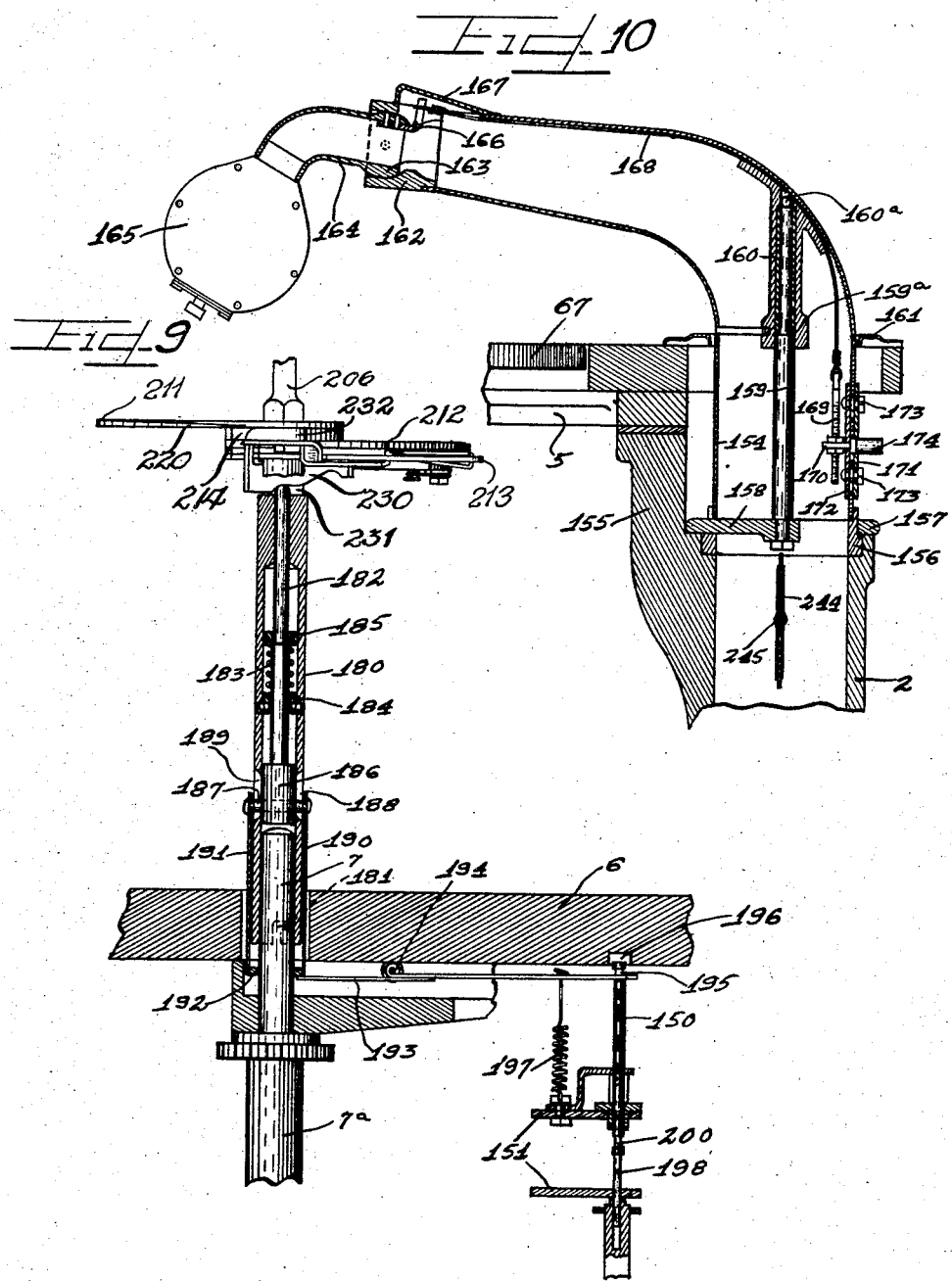

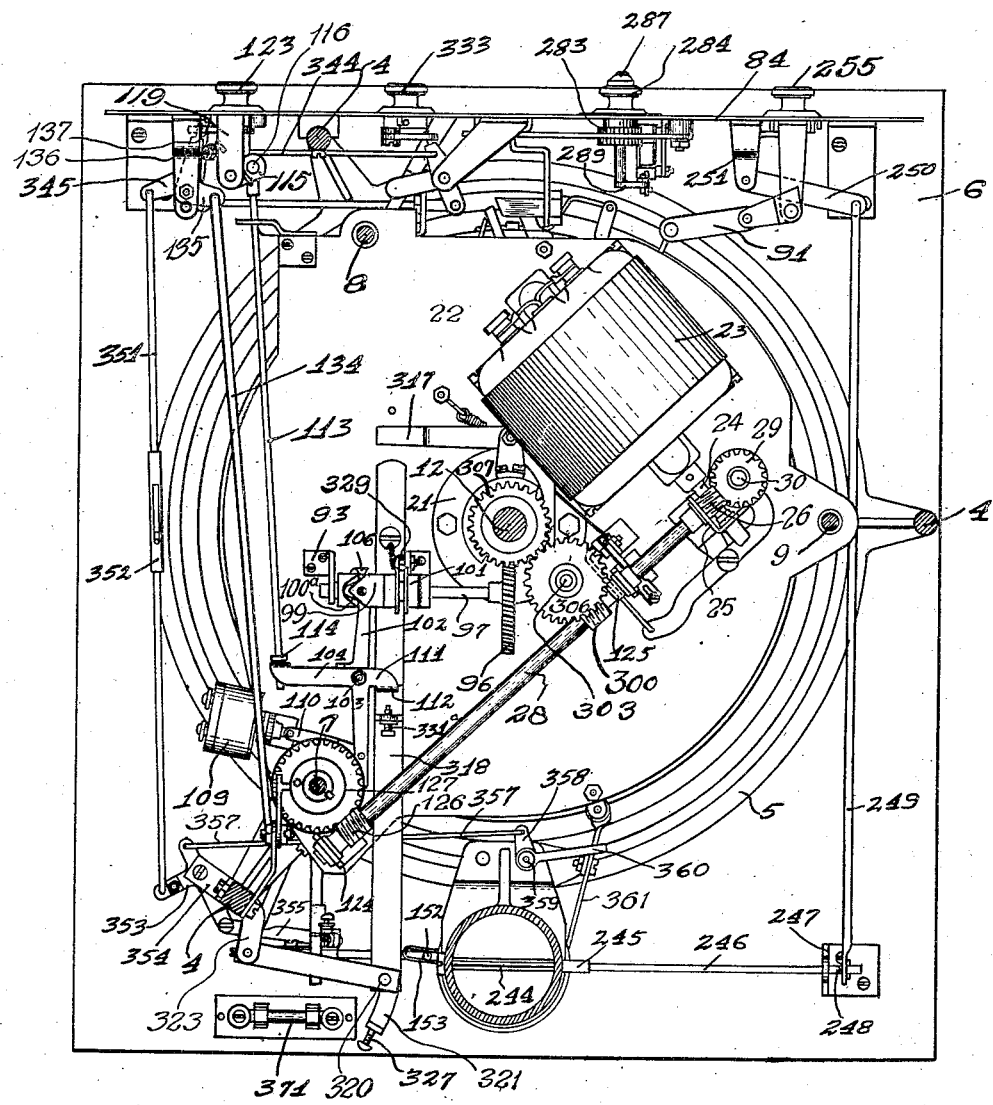

Jan. 19, 1932.    J. H. BENJAMIN    1,841,593
SELF OPERATING TALKING MACHINE
Original Filed Aug. 25, 1921    13 Sheets-Sheet 7

Jan. 19, 1932.   J. H. BENJAMIN   1,841,593
SELF OPERATING TALKING MACHINE
Original Filed Aug. 25, 1921   13 Sheets-Sheet 8
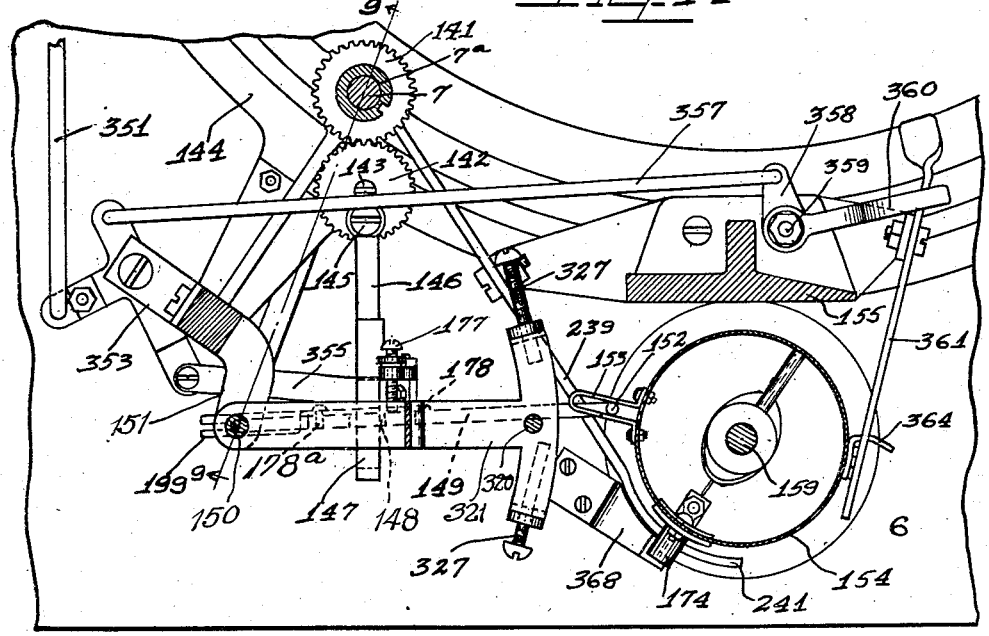
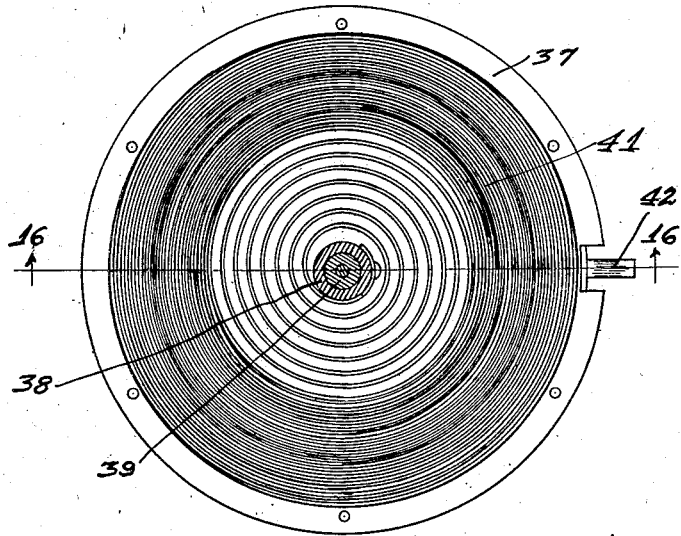

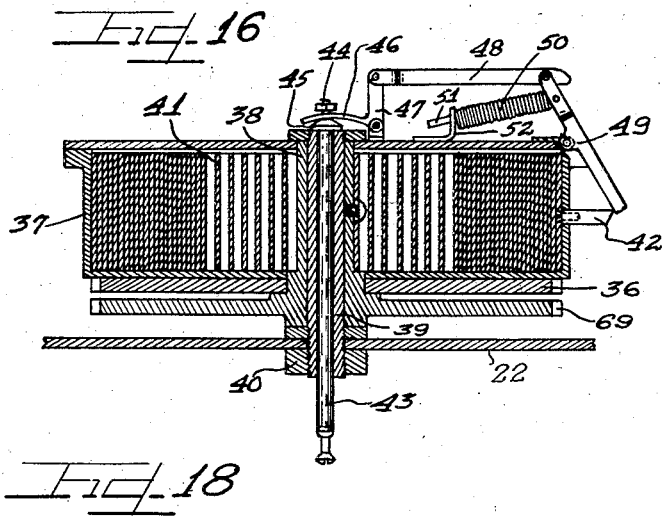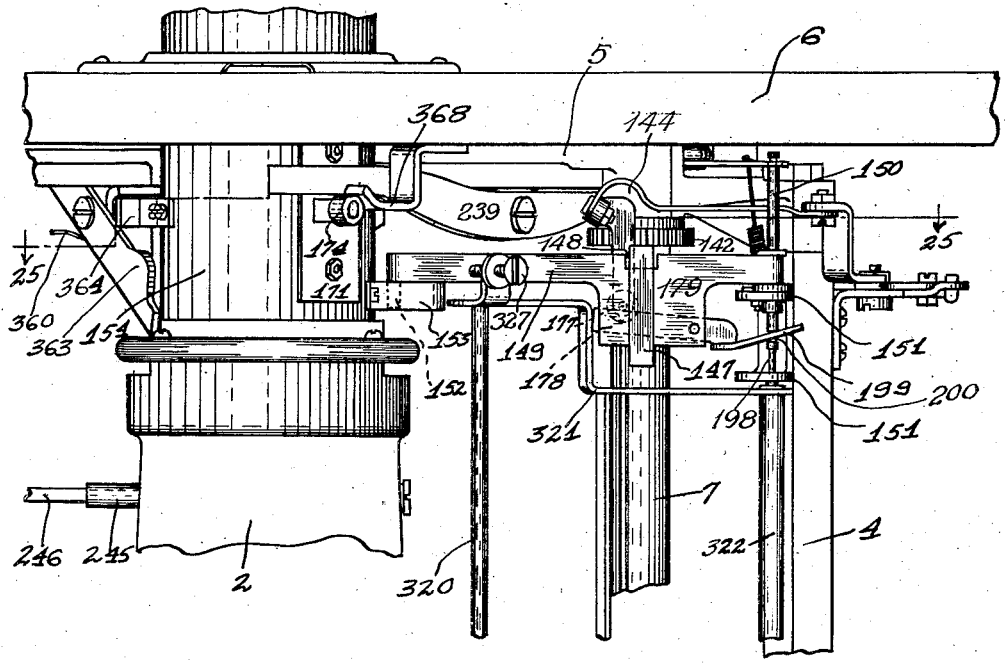

Jan. 19, 1932. J. H. BENJAMIN 1,841,593
SELF OPERATING TALKING MACHINE
Original Filed Aug. 25, 1921 13 Sheets-Sheet 10
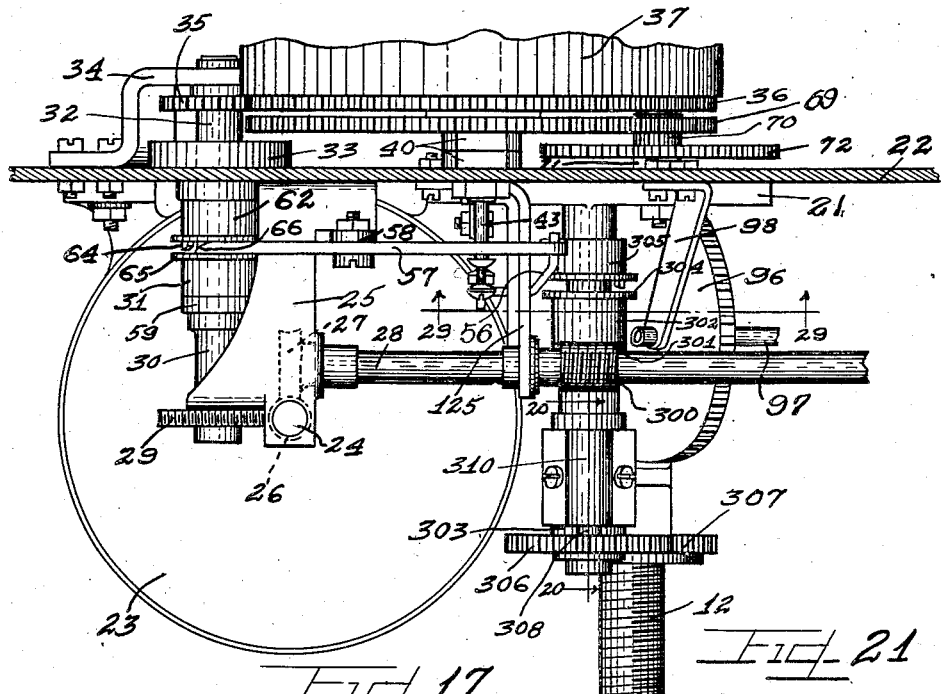
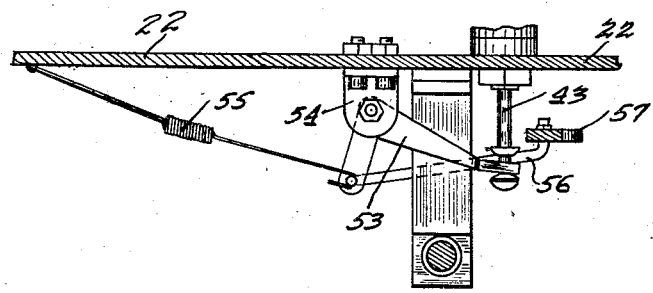
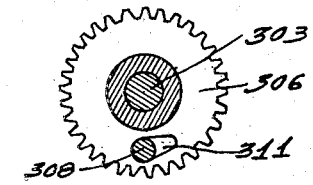
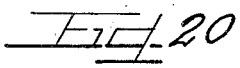
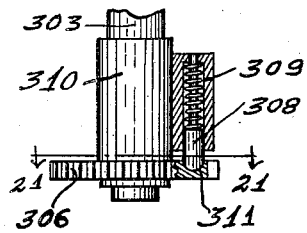
Inventor
James H. Benjamin.

Jan. 19, 1932.　　　J. H. BENJAMIN　　　1,841,593
SELF OPERATING TALKING MACHINE
Original Filed Aug. 25, 1921　　13 Sheets-Sheet 11
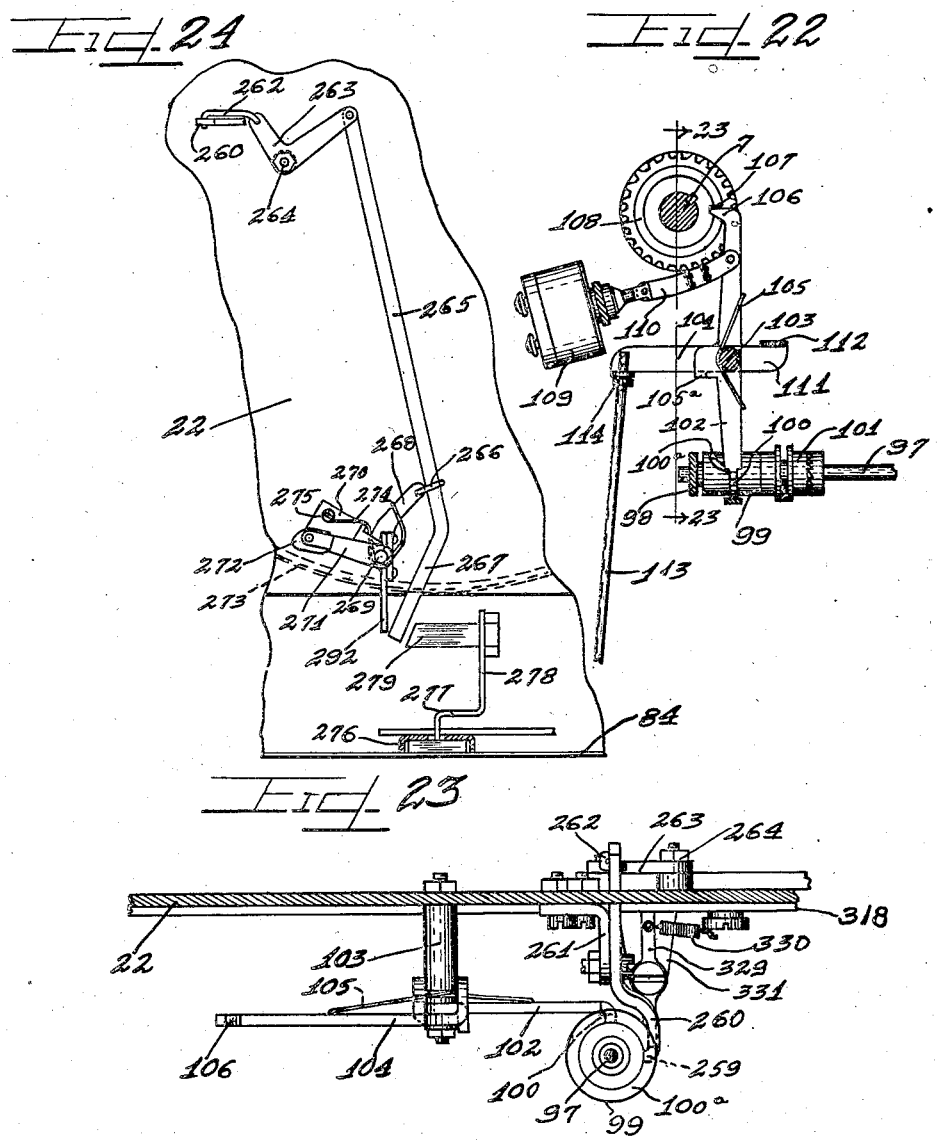

Jan. 19, 1932.   J. H. BENJAMIN   1,841,593
SELF OPERATING TALKING MACHINE
Original Filed Aug. 25, 1921   13 Sheets-Sheet 12
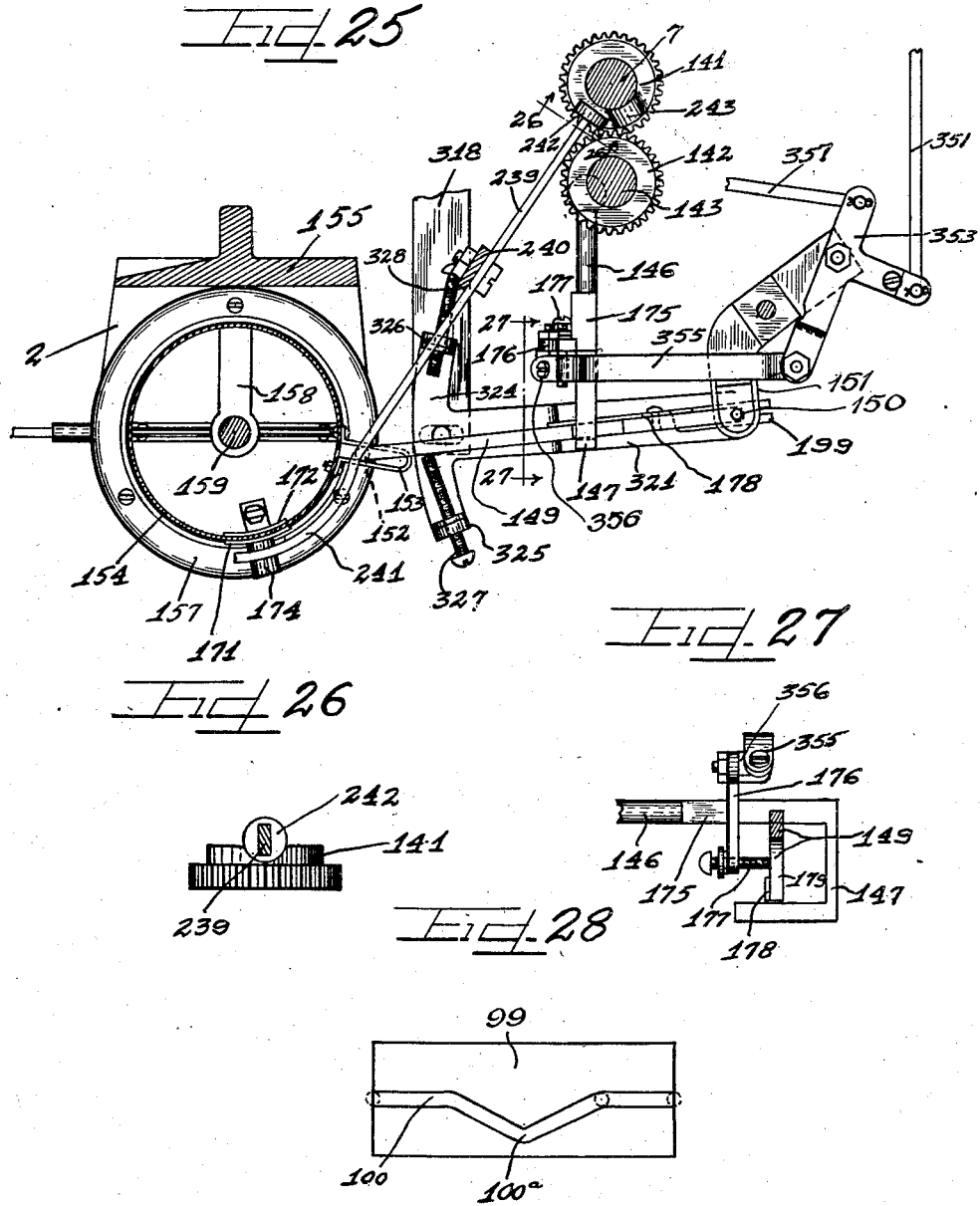

Jan. 19, 1932.   J. H. BENJAMIN   1,841,593
SELF OPERATING TALKING MACHINE
Original Filed Aug. 25, 1921    13 Sheets-Sheet 13
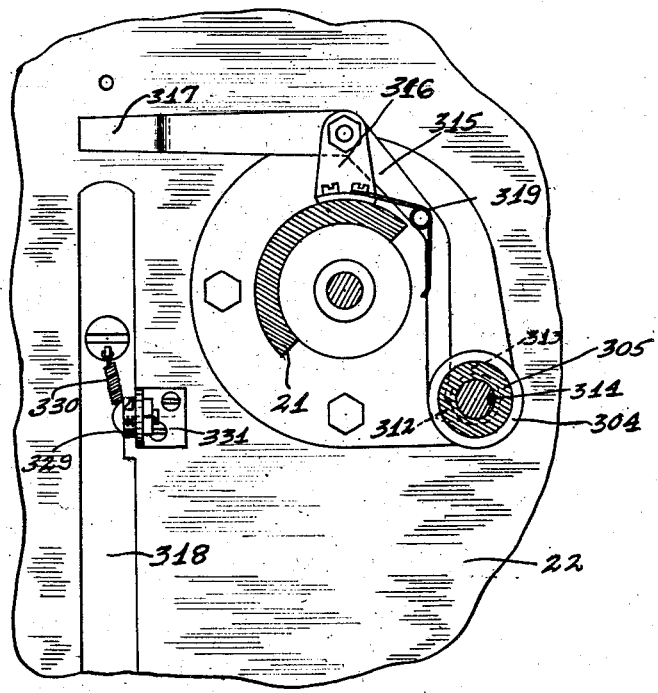
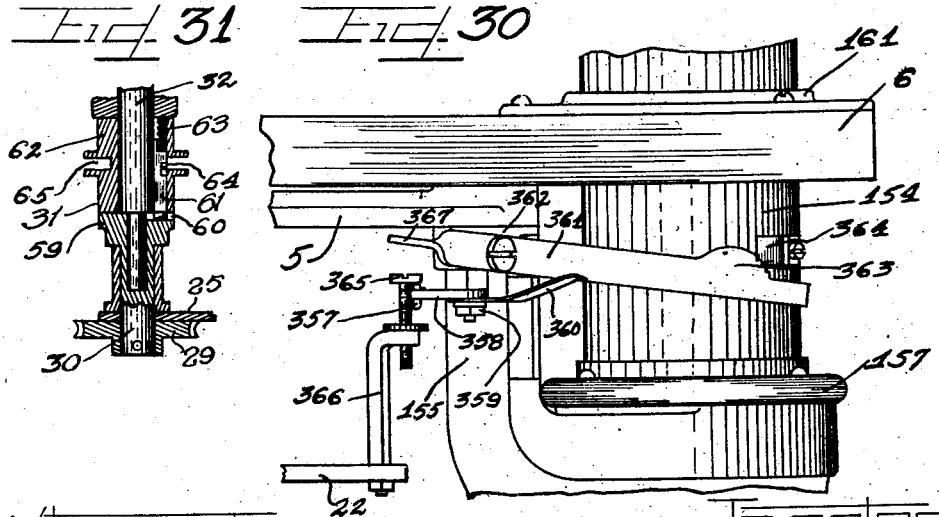

Patented Jan. 19, 1932

1,841,593

UNITED STATES PATENT OFFICE

JAMES H. BENJAMIN, OF CHICAGO, ILLINOIS

SELF-OPERATING TALKING MACHINE

Application filed August 25, 1921, Serial No. 495,247. Renewed April 8, 1929.

This invention relates to a self-operating talking machine, and particularly to a talking machine which is adapted to successively play a plurality of records and which is provided with improved means for controlling the playing operations in accordance with the desires of the operator or audience.

In the operation of talking machines of the nonautomatic or ordinary type, considerable annoyance is occasioned by the necessity for manually changing the records and controlling the mechanism, and it is highly desirable that automatic means be provided for performing this function. In order, however, that arrangements for this purpose may be of any considerable commercial value, it is necessary that the various mechanisms be simple, positive in action and adaptable to economical manufacture and assembly. The design should provide for compact arrangement of the mechanisms and while positive power means for actuating the same should be provided, it is highly desirable that these power means operate noiselessly during the playing of a record.

It is an object of the present invention to provide a self-operating talking machine wherein record changing and attendant operations are effected by a primary power mechanism and wherein a secondary power mechanism which is energized by the primary mechanism actuates the necessary mechanisms to effect the playing of a record.

It is another object of this invention to provide a self-operating talking machine which is adapted to play a plurality of records of varying size successively regardless of the arrangement thereof and without the necessity of manual adjustment.

It is a further object of this invention to provide a self-operating talking machine wherein the reproducer is fed by the engagement of a stylus thereon in a continuous groove in the record, and wherein said reproducer is automatically properly positioned to institute the playing of records of different sizes.

It is a further object of this invention to provide a machine of the class described having an improved automatic stop mechanism.

It is also an object of this invention to provide a self-operating talking machine wherein manually controlled means are provided for discontinuing the playing of any record without interfering with the successive playing of the remaining records in the record magazine.

It is also an object of this invention to provide a self-operating talking machine which is provided with manually operable controlling mechanisms for controlling the playing of individual records and for controlling the record-changing mechanism.

It is a further object of this invention to provide a mechanism of the class described having an improved tone arm construction.

It is another object of this invention to provide a self-operating talking machine which is provided with improved means for raising and lowering the record turntable.

It is an important object of this invention to provide a self-operating talking machine having a plurality of power mechanisms which operate automatically and selectively to effect the successive playing of records or repeated playing of any record.

It is also an important object of this invention to provide a compact and economical and self-operating talking machine which also may be conveniently used as a non-automatic talking machine.

It is finally an important object of this invention to provide a self-operating talking machine wherein a reproducing mechanism is advanced by engagement in the record groove.

Other and further important objects of this invention will be apparent from the disclosures in the drawings and the specification.

The invention (in a preferred form) is shown on the drawings and hereinafter more fully described.

On the drawings:

Figure 1 is a front elevation of an operating unit for a self-operating talking machine embodying the principles of this invention.

Figure 2 is an enlarged fragmentary side elevation of the unit.

Figure 3 is a plan view of the operating unit with the record magazine and record turntable removed.

Figure 4 is a top plan view of the operating unit.

Figure 5 is a top plan view of one of the record magazine supply disks.

Figure 6 is a bottom plan view of the record magazine supply disk shown in Figure 5.

Figure 7 is a bottom plan view, with parts in section, of the master record supply or feeding disk.

Figure 8 is an enlarged fragmentary side elevation of the record supply disk shown in Figure 7.

Figure 9 is an enlarged fragmentary section on the line 9—9 of Figure 14, with parts in elevation.

Figure 10 is an enlarged fragmentary vertical section through the tone arm and reproducer mechanism, with parts shown in elevation.

Figure 11 is a section on the line 11—11 of Figure 2, with parts in elevation.

Figure 12 is an inside elevation of the control panel with parts shown in section.

Figure 12$^a$ is an enlarged view of mechanism for moving shaft 116 outwardly.

Figure 13 is a sectional view on the line 13—13 of Figure 2.

Figure 14 is an enlarged sectional view, with parts in plan, showing a part of the tone arm controlling mechanism.

Figure 15 is an enlarged detail section on the line 15—15 of Figure 2, with parts omitted and parts in elevation.

Figure 16 is a section on the line 16—16 of Figure 15 with parts in elevation.

Figure 17 is an enlarged fragmentary section showing the spring motor control device.

Figure 18 is an enlarged fragmentary side elevation of the tone arm controlling mechanism.

Figure 19 is an enlarged fragmentary side elevation of the spring motor winding mechanism and the controlling means therefor.

Figure 20 is an enlarged fragmentary section on the line 20—20 of Figure 19, with parts in elevation.

Figure 21 is a section on the line 21—21 of Figure 20.

Figure 22 is a fragmentary plan view, with parts in section, showing a part of the control means for the record change mechanism.

Figure 23 is an enlarged fragmentary section on the line 23—23 of Figure 22, with parts omitted and parts in elevation.

Figure 24 is a fragmentary plan view, with parts in section, showing the record stop mechanism.

Figure 25 is an enlarged fragmentary detail section on the line 25—25 of Figure 18, with parts in elevation, showing the tone arm and reproducer controlling means.

Figure 26 is an enlarged detail section on the line 26—26 of Figure 25, with parts omitted.

Figure 27 is a fragmentary detail section on the line 27—27 of Figure 25, with parts shown in elevation.

Figure 28 is a development view of the controlling cam slot shown in Figure 22.

Figure 29 is an enlarged fragmentary section on the line 29—29 of Figure 19, with parts in elevation.

Figure 30 is an enlarged fragmentary side elevation showing part of the tone arm locking mechanism.

Figure 31 is a fragmentary vertical section through the controlling clutch for the spring winding mechanism.

Figure 32 is a wiring diagram of the electrical connections.

As shown on the drawings:

The self-operating talking machine mechanism of this invention is preferably embodied in a unit construction which may be mounted in the ordinary type of talking machine cabinet, and the supporting means for this unit comprise a spider 1 which is rigidly secured to an amplifier or horn 2 by means of a member 3. Secured to the outer end of each arm of the spider 1 is an upright 4, and supported on and secured to the upper ends of said uprights 4 is an upper frame member 5 which in turn supports a top board 6 which is provided with an annular opening in which the talking machine turntable rotates (Fig. 2). Rotatably supported in the arms of the spider 1 and in the frame member 5 are vertical shafts 7, 8 and 9, which are adapted to be rotated simultaneously by driving means to be described hereinafter, and which extend upwardly through apertures in the top board 6 to afford a drive for the record magazine mechanism.

Journalled in the hub 10 of the spider 1 is an internally threaded sleeve 11 which is adapted to receive a vertical screw 12 (Figs. 2 and 13) and which has a sprocket gear 13 connected thereto and adapted to be driven by a sprocket chain 14 which engages the teeth of said sprocket gear and is also engaged around sprocket gears 15, 16 and 17, which are secured to the shafts 7, 8 and 9 respectively, as clearly shown in Figures 2 and 13. A slotted chain tightening member is adjustably mounted on the spider 1 and comprises an upright portion 18 which is adapted to engage the outside of the chain 14, and a slotted horizontal portion 19 which is integral with said portion 18 and which is adjustably secured to the spider 1 by means of a nut and bolt 19$^a$, as shown in Figure 13.

The upper end of the screw 12 is rotatably secured in the lower portion of a bearing bracket 21, and said bracket 21 acts to support a plate 22 which slidably engages the vertical shafts 7, 8 and 9, and which moves up and down with the screw 12 (Figs. 2, 19 and 29).

Secured to the under side of the plate 22, as clearly shown in Figures 2, 11 and 19, is an electric motor 23. The outer end 24 of the motor drive shaft is journalled in a bracket 25 which is secured to the under side of the plate 22, and secured to said shaft 24 inside the bracket 25 is a worm 26 which meshes with a worm wheel 27 secured to the end of a shaft 28 which is journalled in said bracket 25.

Also meshing with the worm 26 is a worm wheel 29, which is secured to the lower end of a vertical shaft 30 which is journalled in the bracket 25 and which is connected by means of a clutch 31 with a vertical shaft 32 which is journalled above the plate 22 in a bracket 34 secured to the upper side of said plate, and which drives through a one-way drag clutch 33. Secured to said vertical shaft 32 above said clutch 33 is a gear 35 which meshes with a gear 36 which is secured to a spring motor casing 37 (Figs. 3, 16, 19, 31) which is rotatably mounted on a sleeve 38, said sleeve 38 in turn being journalled on a sleeve 39 which is threaded in a boss 40 secured to the plate 22. Said casing 37 contains a motor spring 41 which is of the usual flat coil form and which has one end secured to the sleeve 38 and the other end of which is secured to a cam finger 42 which projects outwardly through a slot or opening in the wall of the casing.

Means are provided for automatically disconnecting the clutch 31 when the spring 41 has been wound to the proper tension. For this purpose a rod 43 (see Figs. 16, 17 and 19) is slidably mounted in the sleeve 39 and engaged under a nut 44 on the upper end of said rod, and resting on a shoulder 45 thereon, is a forked portion 46 of a bell crank lever 47 which is pivotally mounted on top of the casing 37 adjacent the upper end of the sleeve 38 and which is connected by means of a link 48 with a lever 49 which is pivotally mounted on the outer end of the casing 37 and the free end of which is adapted to contact the cam projecting member 42. As the spring 41 is wound and the member 42 moves inwardly into the casing, the upper end of said lever 49 is pushed outwardly by a spring 50 which is engaged around a rod 51 between the inner side of said lever and the face of a bracket 52 (Fig. 16) which is secured to the top of the casing 37. This outward movement of the upper end of the lever 49 of course causes an upward movement of said rod 43 and this upward movement of said rod 43 is transmitted to a bell crank lever 53 is shown in Figures 17 and 19 which is connected to the lower end thereof and which is pivoted on the under side of the plate 22 on a bracket 54 and the rotational movement of which is aided by a coil spring 55 secured to one arm thereof and to the under side of the plate 22. The motion of said bell crank lever 53 is transmitted through a crank link 56 to a clutch disengaging finger 57, which is pivoted on the bracket 25 at 58, and acts to move said finger inwardly about said pivot 58 to release the clutch 31 and discontinue the winding drive to the spring motor. The construction of the clutch 31, which is similar to that of other clutches embodied in the present mechanism, is clearly shown in Figure 31 and will now be described.

A female clutch element 59 is formed on the upper end of the shaft 30 and is provided with a notch 60 in its upper face which is adapted to receive the end of a spring pressed pin 61, which is mounted in a recess in a sleeve 62 secured to the shaft 32, and which is normally held downwardly in said notch by means of a coil spring 63 engaged in the recess and abutting the upper end thereof. A cam shoulder 64 formed on said pin 61 extends outwardly into a groove 65 which is formed in the sleeve 62 and is adapted to be engaged by the beveled end 66 of the releasing finger 57 to move the pin 61 upwardly out of the notch 60 and thus disconnect the drive through the clutch element.

As shown in Figs. 2 and 3, the spring motor which has been previously described operates to drive during the playing of the record, a record turntable 67 which comprises an annular disk having a downwardly extending flange. Said turntable rotates in an annular recess in the top board 6 and is secured to the upper end of a shaft 68 which extends upwardly through the plate 22 and which has its lower end journalled in the bearing bracket 21. This drive of the turntable from the spring motor is effected through an escapement mechanism shown more particularly in Figs. 16 and 19 which comprises a gear 69 which is secured to the sleeve 38 and which meshes with a pinion 70 rotatably mounted on a stub shaft 71 extending upwardly from the plate 22 and which is connected to a gear 72 which is also mounted on the stub shaft 71 therebeneath. Said gear 72 meshes with teeth 73 (Fig. 2) formed on the shaft 68 above the plate 22 and consequently acts to rotate said shaft (Figs. 2 and 3).

Means are provided for governing the speed of rotation of the shaft 68 and of the turntable 67 thereon. For this purpose a worm gear 74 is secured to said shaft 68 above the plate 22 and meshes with a worm 75 which is formed in a shaft 76 journalled in brackets 77 and 78 on the upper face of the plate 22 (see Fig. 3). Mounted on the shaft 76 is a centrifugal governor mechanism 79 which is of the usual type and which has connected thereto a brake disk 80 which slides outwardly thereon as the speed increases and the governor balls move outwardly. The outer face of said disk 80 contacts a brake member 81 which is formed on the outer end of a bell crank lever 82 which is pivoted on the upper side of the plate 22 at 83, and it is of course apparent that the effective action of said brake member may be varied by adjusting the angular position of said bell crank lever.

Means are provided for adjusting the angular position of said bell crank lever 82 from a control board 84 which is secured on the front side of the unit outside the upright 4 and beneath the top board 6 (see Fig. 1). Rotatably mounted in said control board 84 is an accelerator control button 85 which extends through to the inner side of the control board and which has a threaded portion thereon which is engaged in a sleeve 86 on the inside of said board (Figures 1 and 12). One end of said threaded portion is secured to one end of a link 87, the other end of said link 87 being secured to a vertical shaft 88 which is supported by arms 88ª (Fig. 12) pivoted on brackets 89 and 90 on the inner side of the control board. It is thus apparent that a rotational movement of the accelerator control button 85 will cause an inward or outward movement of the sleeve 86 and consequently act to rotate the vertical shaft 88. The partial revolutionary movement of said shaft 88 is transmitted through transverse members 91 and 92 thereon to a second vertical shaft 93 (see Figs. 2 and 12) which is separated a short distance therefrom and which has connected thereto and movable vertically thereon a rod 94 which extends across the upper side of the plate 22 and is connected to the free end of the bell crank lever 82 (Fig. 3). As a result of this construction, the rotation of the accelerator member 85 is transmitted through said rod 94 to the bell crank lever and to the brake member 81, thus varying the pressure of the brake member 81 on the disk 80 and consequently regulating the speed of rotation of the turntable 67.

A properly timed mechanism for controlling the record changing and attendant operations is driven from the shaft 68 and for this purpose a worm 95 (Fig. 2) is formed near the lower end of said shaft inside the bracket 21, and said worm 95 meshes with a worm gear 96 which is secured to one end of a shaft 97 journalled in brackets 98 on the under side of the plate 22 (see also Fig. 11). Rotatably mounted on the shaft 97 at the end opposite the worm gear 96 is a sleeve 99 which is provided with a cam slot 100ª (Figs. 11, 22, 23 and 28), and which is adapted to be driven from the shaft 97 by means of a releasable clutch 101 which is constructed and operates in a manner similar to the clutch 31, previously described herein. Engaged in the cam slot 100ª is the downwardly bent end 100 of a lever 102 which is pivoted on a stub shaft 103 extending downwardly from the plate 22 and which is connected to a bell crank lever 104 by means of a downwardly extending boss 105ª which engages the outside of one arm of said bell crank lever and also by means of a spring 105 which is engaged around the shaft 103 and the ends of which engage the outer side of said lever 102 and of the arm of the bell crank lever 104 which is in line therewith. Said arm of the bell crank lever 104 is provided on its outer end with an inward pawl projection 106 which is normally engaged in a notch 107 formed in the periphery of a sleeve 108 which is keyed to the shaft 7 to prevent rotation relative thereto, but which is movable longitudinally on said shaft. Said pawl 106 acts to lock the record magazine drive from operation and is released upon the completion of the playing of each record by the movement of the end 100 of the lever 102 in the cam slot 100ª and coincident with this release of the magazine drive the electric motor 23 is set in operation by the closing of a snap switch 109 which controls the motor circuit and which is connected by means of a link 110 with one arm of the bell crank lever 104 between the pawl 106 and the shaft 103. An extension 111 is formed on one arm of the bell crank lever 104 and a vertical projection 112 on said extension is adapted to operate the record changing mechanism and to control the switch 109 during the operation of a record lift mechanism to be described hereinafter.

Means are also provided for manually releasing the pawl 106 from the notch 107 in order that the playing of any record may be discontinued at will and the record changing mechanism set into operation to bring a new record into playing position. For this purpose a rod 113 is connected at 114 to one arm of the bell crank lever 104 (Fig. 11) and extends transversely beneath the plate 22 to a connection 115 which slidably engages a vertical shaft 116 which is connected by means of brackets 117 (Fig. 12) with a second vertical shaft 118 which is journalled in brackets 119 on the inside of the control board 84 (Figs. 12 and 22). Said shaft 116 is normally held inwardly toward the control board 84 by means of a spring 119ª which is secured around the lower end of the shaft 118 and which engages the outer side of the lower bracket 119. Mechanism is provided for moving the shaft 116 outwardly away from the control board 84 in order to move the rod 113 to rock the bell crank lever 104 and move the pawl 106 out of engagement with the notch 107. This mechanism (Figs. 12 and 12ª) comprises an arm 120 which is integral with the upper bracket 117 and which is engaged in a slotted extension 121 of a plate 122 which is connected to a control device 123 rotatably mounted in the control board 84 and accessible from the front side thereof.

The drive to the record changing and tone arm mechanism and the mechanisms operated thereby will now be described (Fig. 2). The shaft 28 extends across beneath the plate 22 to a bracket 124 which depends from the plate 22 and the end of the shaft is journalled in said bracket, the intermediate portion of the shaft being journalled in a depending bracket 125 (Fig. 11) which is also secured to the under side of the plate 22. A worm 126 is secured on said shaft 28, just inside the bracket 124, and said worm 126 meshes with a worm gear 127 which is secured to the sleeve or collar 108 on a sleeve 7ª on the shaft 7 and which is non-rotatable on the shaft but capable of vertical movement thereon. A drive from the motor 23 is thus transmitted to the shaft 28 through the sleeve 7ª and a drive from the sleeve 7ª is transmitted through a clutch 128 to the sprocket gear 15 secured to the shaft 7 whereby a rotation of said shaft 7 is effected, and also by means of the sprocket chain 14 a simultaneous rotation of the shafts 8 and 9 (Fig. 13) and of the gear 13 is effected. The clutch 128 (Fig. 2) is slidably mounted on the sleeve 7ª and is provided with a finger 129 which engages a similar finger 130 on the sprocket gear 15 to drive said sprocket gear, and means are provided whereby the clutch 128 may be lifted to prevent engagement of said fingers and disconnect the drive to the shafts 7, 8 and 9. Said means comprise a bell crank lever 131 which is pivoted in a bracket 132 secured to an upright 4 and one arm of which is provided with a projection engaged in a peripheral groove 133 formed in the clutch 128. The other end of the bell crank lever 131 has a rod 134 (Figs. 11 and 12) connected therein and said rod affords a connection with one arm of a bell crank lever 135 which is pivoted on a bracket 136 secured to the inner side of the control board 84. The other arm of said bell crank lever 135 is connected with a link 137 which leads to a crank arm 138 secured to a repeat control member 139 which is rotatably mounted in the control board 84 and which extends through to the front side thereof. The movement of said crank 138 is limited by a stop 139ª secured to the inner side of the control board, and said crank also has connected thereto a wire connecting rod 140 for a purpose to be described hereinafter. It will be apparent that the mechanism just described affords means whereby rotation of the repeat control member 139 will effect an engagement or disengagement of the members 129 and 130 of the clutch 128 through the vertical movement of said clutch by the connecting rod 134 and the bell crank lever 131 and consequently the lowering of the record turntable to be described hereinafter and the operation of the record changing mechanism may be discontinued at any time desired and the same record repeatedly played.

Keyed to the sleeve 7ª above the plate 22 (see Fig. 14) is a gear 141 which meshes with a gear 142 which is journalled on a stub shaft 143 extending downwardly from an extension 144 of the upper frame member 5. A pin 145 is eccentrically mounted on the lower side of said gear 142 and pivotally mounted on said pin 145 is a connecting rod 146 which has a hook-shaped bracket 147 secured thereon. Said hook-shaped bracket 147 is engaged in a notch 148 in the upper side of a lever 149 and extends downwardly on the outer side of said lever and again inwardly under the same. Said lever 149 is pivoted at one end on a vertical shaft 150 (Fig. 18) which is slidably mounted in a forked bracket 151 secured to the upright 4 and the other end of said lever has a downwardly extending pin 152 which is engaged between the arms of a U-shaped strap bracket 153 which is secured to the outside of the vertical portion of a tone arm 154 which is rotatably mounted in the upper end of the amplifier or horn 2 in a manner which will now be described (see Fig. 10).

The inner side of said amplifier 2 is provided with an integral upward extension 155 which is secured to the upper frame member 5 and acts to support said amplifier in the proper position. Resting in the annular recess formed in the upper end of said amplifier 2 is a collar 156 which affords a support and guide in which the lower end of the tone arm 154 is freely rotatable, and surrounding said collar 156 is a ring 157 which is secured to the upper end of the amplifier 2 and which is provided with an integral inwardly extending arm 158 which extends underneath the tone arm to a point beneath the axis thereof and has secured therein a shaft 159 which extends upwardly and is journalled in a ball bearing 159ª in a boss 160 which is mounted inside the tone arm at the point where the bend from the vertical portion thereof begins. The upper end of said shaft 159 abuts a ball bearing 160ª in the upper end of the boss 160. Said boss 160 and the arm 158 are preferably rounded toward the entering end of the tone arm so as not to obstruct or modify sound waves passing therethrough. The vertical portion of the tone arm of course extends upwardly through an opening in the top board 6 and is properly centralized in said opening by means of a spring metal plate 161 which is secured on the upper side of the top board and which extends past the edges of the opening therein, being separated however from the outside of the vertical portion of the tone arm. The tone arm is bent inwardly over the record turntable from the bracket or boss 160 and a member 162 in the outer end thereof affords a spherical socket which is adapted to receive a spherical mounting 163 which is formed on the end of a connection 164 leading to a reproducer 165. Secured to the under side of the upper portion of the spherical mounting 163 is a lever 166 which extends upwardly through a slot formed in the upper side of the tone arm beneath a cover plate 167 which is secured to the member 162, and fastened to the upper end of said lever 166 is a flexible connection 168 of piano wire or similar material which leads downwardly inside the top of the tone arm through a passage in the bracket 160 to a screw 169 which is provided at its upper end with an eye in which said flexible connecting member is secured. Said screw 169 is adjustably secured in a member 170 which extends inwardly into the tone arm and which is connected to a pair of plates 171 and 172 which are mounted respectively on the outside and the inside of the tone arm by means of bolts 173 extending through slots formed in the vertical portion of said arm. A portion of the member 170 also extends through said plates 171 and 172 and has a roller 174 rotatably mounted on its outer end, said roller being adapted to be moved downwardly to lift the reproducer 165 upwardly by exerting a tension on the flexible member 168.

The description of the mechanism whereby the tone arm 154 is swung out of operative position upon the completion of the playing of a record will now be resumed, reference being had particularly to Figures 14, 18 and 25. Mounted between the hook-shaped bracket 147 (Fig. 25) and the connecting rod 146 is a rotatable portion 175 which has secured thereto a bracket 176 in which is mounted an adjusting set screw 177 which is adapted to abut the inner side of the lever 149 and consequently control the inward or return swing of the tone arm 154. This control of the inward movement of the tone arm by the adjusting set screw 177 allows the tone arm to be brought into proper position to institute the playing of a record, and means are provided whereby said tone arm may be brought into proper position for the playing of records of different diameters. For this purpose a stop plate 178 is pivotally mounted on a downwardly extending integral portion 179 of the lever 149 and said stop plate is adapted to be moved downwardly so that the end of the adjusting set screw 177 will contact the portion 179 of the lever 149 instead of the plate 178 (see Figs. 14, 18 and 27) and consequently a smaller amount of inward movement of the tone arm will be effected and the tone arm will be brought into proper position for playing the larger diameter records.

The mechanism which controls said pivoted plate 178 and properly positions the same for the different diameter records, as well as the mechanism for feeding these records to the rotating turntable, will now be described. A hollow shaft 180 (Fig. 9) is engaged over the upper end of the shaft 7 and is removably and normally non-rotatably secured to said shaft by means of a bayonet slot and pin connection 181. (Fig. 9.) Slidably mounted in the upper end of the hollow shaft 180 is a rod or shaft 182 which is normally held upwardly relative to said shaft by means of a helical spring 183 which is mounted inside the shaft 180, having its lower end resting on a stationary plate 184 therein and its upper end contacting a plate 185 secured to said rod 182. A plunger 186 is secured to the lower end of the rod 182, and secured transversely of said plunger is a pin 187 which extends outwardly through slots 188 and 189 in the hollow shaft 180 and which has plates 190 and 191 connected to it at their upper ends and movable on the outside of the hollow shaft 180. The lower ends of said plates 190 and 191 are secured to a collar 192 which is slidable on the upper end of the shaft 7 and which contacts one end of a lever 193 which is pivoted on the under side of the plate 6 at 194. The outer end of said lever 193 is bifurcated and is engaged in a groove 195 in the vertical shaft 150 so that when said lever is rocked about the pivot point 194, said shaft 150 is shifted vertically, a recess 196 being provided on the under side of the top board 6 to allow such vertical shifting. This vertical shaft 150 is normally held downwardly by means of a light helical spring 197 (Fig. 9) which has one end secured to the outer end of the lever 193 and the other end of which is secured to the bracket 151. The lower end of the shaft 150 is reduced at 198 and extends through the lower portion of the bracket 151, and a connection whereby the vertical movement of said shaft is transmitted to the pivoted stop plate 178 (Fig. 18) is afforded by an integral forked projection 199 which is formed on the end of said plate 178 and which is engaged in a groove 200 formed at the upper end of the reduced portion 198 of said shaft 150.

The control of the vertical movement of said shaft 150 in accordance with the record diameter from the master record feeding disk mechanism shown in Figure 9 will now be described, reference being had particularly to Figures 7, 8 and 9. Said master disk is secured to the upper end of the shaft 180 and is adapted to coact with similar disks, which extend upwardly from and are removably connected with the shafts 8 and 9 by vertical shafts 201 and 202, to support a magazine 203 of disk records in position above the record turntable (Fig. 1). Said records are maintained in proper alinement above the turntable 67 and are guided in their descent thereupon by means of a vertical extension shaft 204 (Fig. 4) which is removably secured to the turntable shaft 68 and which extends upwardly through the apertures in the centers of the records and the upper end of which is held in aligned position by means of a spider 205. The hub of said spider 205 is engaged over the end of said shaft 204 and the arms thereof extend outwardly and are removably engaged over vertical extensions 206, 207 and 208 which extend upwardly from the disks on the shafts 180, 201 and 202 respectively. The master disk (Figures 7, 8 and 9) which is mounted on the shaft 180 is similar in construction to the record-feeding disks 209 and 210 on the shafts 201 and 202, having the additional feature of a mechanism for controlling the movement of the vertical shaft 180, and said master disk will now be described in detail.

Secured to the upper end of the shaft 180 directly beneath the lower end of the extension 206 thereon are segmental plates 211, 212 and 213 (Fig. 8) which are in different horizontal planes and which are adapted to support the records 203 thereon. In Figure 8 said plates are separated by openings at 214 and 215 so that records of small and large diameter, respectively, may move outwardly therebetween when the shaft 180 is rotated and consequently be allowed to drop downwardly along the extension shaft 204 onto the record turntable 67. The records are normally supported on the upper segmental plate 211 and as the shaft is rotated are lowered down inclined portions 216 and 217 (Figs. 5 and 7) from said plate to the plates 212 and 213 respectively. Means are provided to prevent the discharge of a small diameter record through the opening 215 when a large diameter record is being discharged through the opening 214. For this purpose a plate 218 is pivotally mounted on the plate 212 at 219 and is adapted to be rotated about said pivotal connection to form a sloping extension of the plate 212 which contacts the under side of a tapered extension 220 on the plate 211, thus closing the opening 214. Said plate 218 is adapted, however, to be normally maintained in such position that the opening 214 is open and this positioning of said plate 218 is accomplished by means of a light spring 221 which is secured to the under side of the plate 213 and the free outer end of which contacts a tail lever 222 formed on the plate 218 and extending outwardly from the pivot 219. Pivoted on the upper side of the plate 213 at 223 is a lever 224 which is provided with an extension 225 movable between the plates 212 and 213 and adapted to be contacted by a record discharged through the opening 215. Integral with said extension 225 and movable in a slot 226 in the plate 213 is a cam plate 227 which is adapted to contact the upper end of a vertical extension 228 on the tail plate 222 and consequently rock said tail plate and the plate 218 about the pivot 219 to close the opening 214 when a record of large diameter is discharged through the opening 215.

After the discharge of the large diameter record through the opening 215, however, the lever 224 and the cam plate 227 are again moved outwardly by means of a spring 229 which is secured to the upper side of the plate 213 and the free end of which contacts the inner side of said lever 224, and consequently the plate 218 is moved away from the opening 214 by the spring 221, leaving the disk in position to discharge a record of small diameter.

It will be noted that the surface of each disk (see Figures 5 and 8) slopes spirally beginning at 211. The edge of the records bear on the edge of the disks as the disks revolve. As the disk in Figure 5 revolves counterclockwise, it will be seen that the record edge, if the record is of large diameter, will ride from 211 to 212 and eventually drop off the lift 218 into the opening 214. If the record is of small diameter the edge of the same will be caught by lift 220 and it will ride on 213 and off 234 into opening 215. 219 is squared at the point where 218 is stamped around it but it is rounded at its pivot position.

The mechanism which is provided for moving the vertical rod 182 downwardly to work the lever 193 and the vertical shaft 150 to properly position the plate 178 for the discharge of a record of large diameter will now be described. This mechanism comprises a semi-cylindrical cam member 230 (Fig. 9) which is pivoted on the under side of the plate 211 at 230ª (Fig. 7) on one side of the center of said plate, and said cam 230 extends through a recess or opening 231 in the upper end of the shaft 180 and is also provided with a portion 232 (Fig. 9) which extends upwardly above the plate 212 adjacent the opening 215 and which is adapted to be contacted by a large diameter record upon the rotation of the disk to move the cam 230 inwardly, thus forcing the vertical shaft or rod 182 downwardly. Said cam 230 is returned to normal position upon the discharge of a small diameter record by means of a lever 233 (Fig. 7) which is pivoted on the under side of the plate 213 at 214 and which is adapted to be moved inwardly with the lever 224 by means of a pin 235 which is secured to said lever 224 and extends downwardly through a slot in the plate 213 and contacts the outer side of the lever 233. Said lever 233 is normally held in outward position away from the cam 230 by means of a spring 236 secured to the under side of the plate 213 and to the pivot 234 and having its free end contacting a pin 237 on the under side of the lever 233. The records are preferably guided down the inclined portions 216 and 217 (see Fig. 5) and held in proper position relative thereto by means of a guide flange 238 which is secured to the upper side of the plate 218.

The record feeding disks 209 and 210 are constructed the same as the master disk just described, with the cam mechanism for actuating the vertical rod 182 omitted, and for this reason these disks need not be described in detail herein. Said disks 209 and 210 are shown in Figures 4 and 5, and the same reference numerals have been applied to the same parts in said figures which appear in Figures 7 and 8 and which have already been described in detail.

A mechanism is provided for lifting the reproducer 165 upwardly to remove the stylus therein from the record upon the completion of the playing of the same, in order that the tone arm 154 may be swung away from the record, and said mechanism, which is timed from the gear 141 and operated therefrom, also acts to lower the reproducer so that the stylus therein is introduced into the proper record groove upon the commencement of the playing of a record. The mechanism which is provided for accomplishing this function comprises a lever 239 (see Fig. 25) which is pivoted on a bracket 240 extending downwardly from the frame member 5 which is just above the mechanism shown in Fig. 25 and which is provided with a curved portion 241 which extends over the roller 174 that is connected to the vertically movable plates 171 and 172 to transmit the vertical motion thereof to the flexible reproducer lifting member 168 (Fig. 10). During the playing of a record a roller 242 on the end of said lever 239 rests in a cam depression 243 in the upper face of the gear 141, and upon the completion of playing the record the rotation of said gear 141 causes said roller to be moved on to the higher flat surface of said gear and consequently causes a downward movement of the end 241 of said lever, which downward movement is in turn transmitted through the roller 174 and the plate 172 to the flexible reproducer lifting member 168 which acts to lift the reproducer 165 upwardly. The completion of the rotation of said gear 141 of course allows the roller 242 to again seat in the cam depression 243 and the reproducer 165 is allowed to again be lowered by gravity due to the upward movement of the end 241 of the lever 239, which allows the plates 171 and 172 to move upwardly. Since this raising and lowering of the reproducer is controlled by the same mechanism which controls the swinging movement of the tone arm, it is evident that the same may be conveniently timed to lift the reproducer prior to the outward swinging movement of the tone arm and to allow the same to be lowered at the proper time relative to the inward swinging movement thereof.

A modulator (see Figs. 10, 11 and 18) is provided for properly regulating the volume of sound emanating from the amplifier 2, and said modulator preferably comprises a butterfly valve 244 which is secured to a shaft 245 which is journalled in the walls of said amplifier 2 and one end of which projects laterally therefrom and is provided with an extension 246 which has its outer end journalled in a bracket 247 depending from the top board 6. The outer end of said extension 246 (Fig. 11) has a crank 248 formed thereon, and connected to said crank 248 is a link 249 which extends underneath the top board 6 and is connected to one arm of a bell crank lever 250 which is provided on a bracket 251 secured to the rear side of the control board or panel 84. The other arm of said bell crank lever 250 is connected to a crank 252 (Figs. 1 and 12) which in turn is connected to an eccentric 253 on a plate 254 which is rotatably mounted in the control board or panel 84 and which has an operating button 255 (Fig. 1) connected thereto and extending through to the front side of the control board. The movement of said plate 254 (Fig. 12) and consequently the effect of the modulator control button is limited by means of a pin 256 which extends outwardly from the periphery thereof and which is adapted to contact stops 257 and 258 which extend inwardly from the inner side of the control board.

A suitable mechanism is provided for cutting the machine out of operation after a predetermined number of records have been played, said predetermined number of records having been previously determined and the machine set therefor by the manipulation of a control button on the control board 84. This stop mechanism is shown in detail in Figures 23 and 24, and as shown is controlled from the cam slot 100ᵃ. Engaged in said cam slot 100ᵃ is a finger 259 which is formed on the lower end of a vertical lever 260 which is pivoted on a bracket 261 depending from the under side of the plate 22. The lever 260 extends upwardly through a slot in the plate 22 which prevents lateral movement of said lever as the cam rotates. The upper end of said lever 260 is connected by means of a link 262 with one arm of a bell crank lever 263 which is pivoted on the upper side of the plate 22 at 264, and connected to the other arm of said bell crank lever 263 is a rod 265 which extends across the upper side of the plate 22 beneath a guide 266 and has the outer end thereof bent to form a cam portion 267 thereon. The edge of said bar 265 is adapted to contact the outer end of a lever 268 at a point adjacent the guide 266. Said lever 268 is connected to the lower end of a vertical shaft 269, which is pivotally supported on the plate 22 in a bracket 270, and secured to the upper end of said shaft 269 is an arm 271 which has a brake or stop 272 of felt or other suitable material thereon which is adapted to contact the inside of the depending peripheral flange 273 on the turntable 67. The position of this flange 273 is indicated in dotted lines in Figure 24, and it is of course apparent that when the brake or stop 272 is brought into contact with the inner side of said flange the rotation of said turntable will be prevented. Said stop 272 is normally held away from the flange 273 by means of a spring 274, which is secured to the bracket 270 at 275 and which extends around the shaft 269 and is connected to the lever 268. As the cam 99 rotates, the motion thereof will be transmitted through the lever 260, the link 262 and the bell crank lever 263, to the bar 265 which moves inwardly and outwardly in the guide 266.

The automatic stop controlling means comprise a vertical track 276 which is secured to the inner side of the control board 84 (see Figs. 3, 12 and 24) and which has a bracket 277 secured thereto and movable vertically thereon. Secured to an extension 278 on said bracket 277 is a cam member 279 (Fig. 24) which is adapted to contact the cam portion 267 on the bar 265 and consequently force said bar to rotate the lever 268, thus moving the stop 272 into contact with the flange 273 on the turntable. Said bracket 277 and the cam portion 279 are brought into adjusted position by means of an arm 280 (Fig. 12) which is connected to said bracket and which is integral with a segment 281 pivoted on the inner side of the control board 84 at 282. The angular position of said segment 281, and consequently the vertical position of the bracket 278 and the cam portion 279, may be adjusted by means of a pinion 283 which meshes with said segment and which is connected to a rotatable control device 284 (Fig. 1) which is mounted in the control board 84 and projects through to the front side thereof. A pointer 285 is secured to said control device 284 and is adapted to coact with a dial 286 on the front of the control board to indicate the number of records for which the machine is set.

A mechanism which is provided for manually controlling the electric circuit leading to the motor 23 comprises a rotatable operating button 287 (Fig. 11) which is coaxial with the control device 284 and which is mounted on the outside of the same and rotatable independently thereof. Connected to said switch operating device 287 is a shaft 288 (Fig. 12) which extends through the control board 84 and through the pinion 283 having an arm 289 connected to the inner end thereof. The outer end of said arm 289 is connected by means of a link 290 with a snap switch 291 which is connected in the motor circuit and consequently the rotation of said operating button 287 may be utilized to open or close said snap switch 291.

Means are also provided for manually moving the stop 272 into contact with the flange 273 (Fig. 24) to stop the rotation of the turntable 67 (Figs. 3, 12 and 24). For this purpose an arm 292 (Fig. 24) is connected to the shaft 269 beneath the arm 271 and said arm 292 is adapted to be contacted by a downward projection 293 (Fig. 12) on a rod 294 which is slidable on the under side of the top board 6 in a bracket 295 and which has one end pivotally connected to a crank 296 formed on the end of a shaft 297 (Fig. 3) which extends upwardly through the top board 6 and which has an operating lever 298 connected to its upper end, said operating lever being movable on a bracket 299 secured to the upper face of said top board and being frictionally held in adjusted position by said bracket (Fig. 3).

A mechanism (Fig. 19) which is provided for automatically raising the plate 22 and the turntable 67 with the records thereon upwardly into position so that the records may be removed therefrom and replaced in the record magazine or stored in any suitable place will now be described. The drive for this record lift mechanism is transmitted from the motor 23 to the shaft 28 and formed on said shaft 28 intermediate the ends thereof is a worm 300 which meshes with a worm gear 301 secured to a sleeve 302 which is rotatably mounted on a shaft 303 which is journalled in suitable bearings in the bracket 21. This sleeve 302 has a clutch element 304 formed in the upper end thereof, and said clutch element coacts with a clutch element 305 which is secured to the upper end of the shaft 303 and which coacts with the clutch element 304 to provide a releasable clutch which operates in a manner similar to the clutch which has already been described and which is shown in detail in Figure 31. Secured to the lower end of said shaft 303 is a gear 306 which meshes with a gear 307 secured to the upper end of the screw 12 and which acts to rotate said screw relative to the hub 10 (Fig. 2) of the spider 1 and cause an upward movement of said spider and the mechanism supported thereon. In order that said screw 12 may be held from rotation at all times except when the record lift mechanism is in operation, a spring-pressed detent 308 is provided which is mounted in a boss 309 (Fig. 20) on a sleeve bracket 310 near the lower end of the shaft 303 and which is adapted to be engaged in a recess 311 formed in the upper face of the gear 306 to prevent reverse movement of said gear and at the same time allow the same to be driven forwardly by the rotation of the shaft 303. The clutch afforded by the portions 304 and 305 is normally held released by a finger 312 (Fig. 29) which is engaged in a recess 313 therebetween and which is adapted to hold a spring-pressed finger 314 out of clutching engagement (Fig. 29). Said finger 312 is formed on one end of a lever 315 which is pivoted on a bracket 316 secured to the bracket 21, and the end 317 of which is adapted to be contacted by the end of a bar 318 which is slidably mounted on the under side of the plate 22. In order that said finger 312 may be held in the groove or recess 313, a spring 319 is provided which is secured to the bracket 316 and the free end of which contacts the outside of the lever 315 acting to force said finger 312 inwardly (Fig. 29). The outer end of said bar 318 (see Fig. 11 and Fig. 18) is slidably connected to a vertical shaft 320 which is supported in a frame 321, said frame 321 being in turn supported on a vertical shaft 322, the upper end of which is pivotally mounted on the under side of the bracket 151 and the lower end of which is pivotally mounted in a bracket 323 (see Figs. 2 and 18). Mounted on the upper side of the frame 321 (Fig. 25), above the vertical shaft 320, is a bracket 324 which is provided with upstanding ears 325 and 326, in which are adjustably mounted set screws 327 and 328 which are adapted to be contacted by the lever 149 to rotate the frame 321 and consequently move the bar 318 when the tone arm 154 is moved outwardly or inwardly upon the institution of or upon the completion of the record lifting operation. This inward movement of the bar 318 which is effected when the tone arm 154 is moved outwardly prior to the record lifting operation allows a clutch disengaging member 329 (Fig. 11) to be brought into position to disengage the clutch 101 by means of a spring 330 (Fig. 23) which is connected to the under side of said bar and to the upper end of said lever 329 which is pivoted on a bracket 331 secured to the under side of the plate 22 (see Fig. 23). This disconnection of the clutch 101 by the member 329 of course acts to discontinue the rotation of the cam 99 during the record lifting operation. The inward movement of the bar 318 is also transmitted to the lever 104 (Fig. 11) by the engagement of a set screw 331ª which is mounted on the under side of said bar 318, with the upstanding boss 112 which is formed on the extension 111 of said lever 104. This of course acts to hold the snap switch 109 in closed position and also acts to hold the finger 106 out of the notch or depression 107 consequently permitting rotation of the shaft 7.

A control mechanism is provided for properly positioning certain of the mechanisms for the record lifting operation and locking certain of the other mechanisms out of operation during this record lifting. Said mechanism is operable from the control board 84 and comprises a record lift control button 333 which projects from the front side of said control board and which is rotatably mounted therein, having a plate 334 (Fig. 12) connected to its inner end on the inside of the control board 84. Said plate 334 has an eccentric 335 thereon, and connected to said eccentric 335 is a connecting link 336 which affords a connection to a lever 337 which is secured to a vertical shaft 338 journalled in brackets 339 and 340 at the top and bottom of the control board 84. Secured to said shaft 338 above the lever 337 is an arm 341 which is adapted to be engaged under a spring 342 which is secured to the inner side of the control board 84, and which acts to lock said shaft from rotation and hold the various mechanisms in proper adjusted position during the record lifting operation. Secured to the upper end of said shaft 338 is an arm 343 which has one end of a link 344 pivotally connected in its outer end, and said link 344 extends across the inner face of the control board 84 and has its other end pivotally connected in one arm of a bell crank lever 345 which is pivotally mounted on a horizontal bracket 346 secured to the inner side of the control board. Secured to said link 344 is a bracket 347 which is provided with a horizontally projecting tooth 348, and said horizontal tooth 348 is adapted to be engaged in a notch 349 formed in a collar 350 secured to the upper end of the shaft 8, and consequently prevent rotation of said shaft during the record lifting operation.

Connected to the outer arm of the bell crank lever 345 (Fig. 11) is a link or rod 351 which is provided with a central slip joint connection 352 and which has its other end pivotally connected in a double-arm bell crank lever 353 pivoted on a bracket 354 which is secured to the corner post 4 near the upper end thereof. One arm of said bell crank lever 353 has a link 355 pivotally connected therein, and said link 355 (Fig. 25) has its other end connected at 356 (Fig. 25) to the upper end of the member 176 which is secured to the rotatable member 175, and consequently the actuation of said link 355 acts to rotate said member and move the set screw 177 out of the way of the lever 149, whereby the inward movement of said lever is only controlled by the set screw 328. Pivotally connected in the other end of said bell crank lever 353 is a connecting rod or wire 357, which is also pivotally connected to a lever 358 which is pivoted on the amplifier 2 at 359, and which has a leaf spring 360 secured thereto for rotation therewith (see Figs. 11 and 30). Said leaf spring 360 is adapted to contact the under side of a lever 361 which is pivoted on a bracket 362 secured to the under side of the frame member 5, and said lever 361 extends outwardly along the outside of the tone arm and is provided with a step portion 363 which is adapted to be engaged under a bracket 364 secured to the outside of the tone arm to hold said tone arm out of the way of the ascending records during the record lifting operation. Said lever 361 is released from the bracket 364 upon the completion of the record lifting operation by means of a set screw 365 which is adjustably mounted in a bracket 366 extending upwardly from the plate 22, and which contacts the outer end 367 of said lever 361 when the limit of the lifting movement is reached.

The reproducer 165 is held upwardly during this record lifting operation by means of a bracket 368 (Fig. 18) which is secured to the under side of the top board 6 and which is adapted to contact the upper side of the roller 174 when the tone arm 154 is swung into outward position.

An interconnection between the repeat mechanism and the record lift mechanism is afforded by the link 140 which is connected in the lever 337 and which is also connected with a one-way connection to the link 137. This construction insures the release of the clutch 133 during the continuance of the record lifting operation.

The electrical connections of the mechanism of this invention are very simple, and a simplified wiring diagram thereof is shown in Figure 32. Electric current from any suitable source is furnished by line wires 369 and 370 which are secured to the under side of the top board 6. Current entering through the wire 369 goes through a suitable fuse 371 which is mounted on the under side of the top board 6, and from said fuse 371 the current flows through a conductor 372 to the snap switch 109, from whence a conductor 373 leads to one terminal 374 of the motor 23. From the other terminal 375 of said motor 23 a conductor 376 leads to the snap switch 291, the other side of which is connected to the line wire 370.

The operation is as follows:

Assuming that the motor circuit is connected with a suitable source of electric current and that a magazine of records 203 is in position on the record supporting disk, it is only necessary to actuate the record change control button 123 to set the machine in operation and to cause the deposition of the bottom record in the magazine 203 on the rotating turntable 67, and after this institution of the playing operation, all of the records in the magazine will be automatically played in successive order, subject to any controlling operations which thereafter may be effected. This actuation of the record change control button 123 is transmitted through the rod 113 (Fig. 22) to the bell crank lever 104, thereby releasing the finger 106 from the notch 107, thus permitting the rotation of the shaft 7 and at the same time closing the snap switch 109 and causing a starting up of the electric motor 23 and certain of the drives actuated thereby. This drive from the electric motor is transmitted to the shaft 7 by means of the shaft 28 (Fig. 11) and the rotation of said shaft 7 is transmitted by the sprocket chain 14 (Fig. 13) to the shafts 8 and 9 and to the gear 13 which is engaged around the screw 12. The relative engagement of said gear 13 with the screw 12 acts to lower the record turntable 67 to the proper level to receive the record in proper playing position, and rotation of the shafts 7, 8 and 9 is of course transmitted to the extension shafts 180, 201 and 202, through the master record supply disk (Figs. 1 and 4) and through the record supply disks 209 and 210, thereby moving said disks into such position that a record is discharged through the opening 214 (Figs. 8 or 6) therein, in case the record be of small diameter, and allowed to move down the guide rod 204 to the turntable, the descent of the record being cushioned by the air which is pushed outwardly thereunder during its downward movement. Prior to this releasing and dropping of the record, however, the reproducer 165 has been lifted upwardly and the tone arm 154 (Fig. 25) swung to one side of the turntable by the rotation of the gear 141 on the shaft 7. This rotation of the gear 141 is transmitted through the lever 239 and the cam roller 242 to the roller 174 which connects with the flexible reproducer lifting means 168 and acts to lift said reproducer upwardly and the rotation of said gear 141 is also transmitted through the gear 142 meshing therewith and the connecting rod 146 and the hook-shaped member 147 thereon to the lever 149 which is moved inwardly and acts through the U-shaped bracket 153 to swing the tone arm outwardly as soon as the reproducer is lifted. After the record has descended into position on the turntable, the continued rotation of the gear 141 brings the set screw 177 into position to contact the downwardly extending portion 179 (Fig. 27) on the lever 149, or the plate 178 thereon, and consequently acts to swing said lever outwardly to move the tone arm into the proper position to institute the playing of the record. As soon as the tone arm has moved into this position, the gear 141 has rotated sufficiently to bring the depression 243 in its upper face into register with the roller 242, thereby releasing the end of the lever 239 and allowing the reproducer to be lowered so that the stylus therein enters the proper groove in the record to begin the playing operation. The movement of the tone arm relative to the record during the playing operation is solely effected by the engagement of the stylus on the reproducer with the groove in the record.

As the playing of the record continues, the cam 99 (Fig. 22) is rotated in timed relation therewith by means of the drive through the worm 95, the worm gear 96 and the shaft 97, and this rotation of said cam 99 causes an advancing movement of the cam slot 100$^a$ therein, gradually moving the finger 106 on the bell crank lever 105 out of the notch 107, where it has been moved into position by the continued rotation of the shaft 7 at the time the record started playing. Said cam slot 100ª moves in proper timed relation so that said finger 106 is disengaged after the playing of the record is entirely completed, and this disengagement of said finger 106 is coincident with the closing of the switch 109 and the starting of the electric motor. This of course allows the shaft 7 to again be rotated causing the reproducer 165 to be lifted and the tone arm again swung away from the record turntable, the lowering of the turntable and the subsequent deposition of a new record thereon. Assuming this new record to be of large diameter, the subsequent operations which are effected upon the release of the same will now be described.

The record of large diameter is discharged or released from the record supporting disk through the opening 215 (Fig. 8 between the two members 212 and 213) therein, and as the record is brought into discharging position the cam 230 is engaged by the edge thereof and moved outwardly thereby, thus forcing the rod 182 (Fig. 9) downwardly, the motion of said rod being transmitted through the arms 190 and 191 and the collar 192 to the lever 193, through said lever to the vertical shaft 150 which is moved upwardly, thus moving the stop plate 178 into position where it will not be contacted by the adjusting set screw 177 (Fig. 25). This results in a smaller amount of inward movement of the tone arm by the lever 149 and the reproducer is consequently brought into the proper position for the introduction of the stylus thereon in the initial groove of the large diameter record. By the time this positioning operation has again been effected, the cam slot 100ª (Fig. 22) is of course moved into the proper position to again open the switch 109 and to cause the engagement of the finger 106 with the notch 107, thus preventing further rotation of the shaft 7 and the mechanisms connected therewith (Fig. 13).

The motor spring 41 (Fig. 16) is wound during the record changing operations, and since the snap switch 109 (Fig. 22) is opened at the beginning of the record playing operation, the power from said motor spring is necessarily utilized to drive the turntable during the playing operation. This produces a desirable result in that the hum which is occasioned by the running of the electric motor is eliminated and only the quiet running spring motor is in operation when the record is being played. By the use of a spring motor, objectionable irregularities in the speed of rotation of the record turntable, which occur when the same is electrically driven, are obviated. The winding drive to the motor spring which takes place during the record changing operation is transmitted through the worm wheel 27 (Fig. 19) on the shaft 28, to a worm 26 on the shaft 24, and said worm 26 in turn meshes with a worm wheel 29 mounted on the shaft 30, whence the drive is transmitted through the clutch 31 and the one-way clutch 33 to the gear 35 which meshes with the gear 36 and acts to rotate the casing 37 to wind the spring 41. As said spring is wound the cam projection 42 (Fig. 16) thereon moves inwardly and this inward movement of said cam projection allows the lower end of the lever 49 to be moved inwardly by the spring 50, and consequently the shaft 43 is moved upwardly and this upward movement of said shaft 43 is transmitted through the bell crank lever 53 (Fig. 17) and the crank connecting link 56 to the lever 57 which is moved inwardly to engage the finger 64 (Figs. 19 and 31) and release the clutch 31. As a result of this construction there is no danger of the spring 41 being wound too tight, since the drive thereto is released as soon as the cam projection 42 has moved inwardly a predetermined distance.

The record stop mechanism whereby the machine may be cut out of operation after the playing of a predetermined number of records has already been described in detail, and in order to operate said mechanism it is only necessary to rotate the control button 284 (Fig. 1) into such a position that the pointer 285 thereon indicates the desired number of records on the dial 286, this rotative movement of the control button 284 being transmitted through the pinion 283 (Fig. 12) and the segment 281 to move the cam projection to a predetermined height whereby the same will be contacted by the cam portion 267 (Fig. 24) on the bar 265 when said portion reaches the same height as said cam projection, and the stop or brake 272 (Fig. 24) is thereby brought into contact with the inside of the flange 273 to stop the rotation of the turntable. The mechanism is so timed through the cam slot 100ª (Fig. 22) that this stopping of the rotation of the turntable occurs prior to the closing of the snap switch 109, so that the electric circuit is always left open when the turntable is stopped by the automatic stop mechanism.

The speed of rotation of the record turntable may be controlled by rotation of the accelerator button 85 (Fig. 1) which acts through a mechanism which has already been described in detail to vary the position of the brake or stop 81 (Fig. 3) and thus vary the pressure exerted thereby on the face of the disk 80 which is connected to the governor mechanism 79.

In case it is desired to repeat the playing of any record, the record magazine feeding mechanism may be cut out of operation by rotating the repeat control button 139 (Fig. 1) which acts through the connecting rod 134 (Fig. 2) and the bell crank lever 131 to release the clutch 128 and disconnect the drive to the shafts 7, 8 and 9 and to the screw 12. This disconnection of the drive to said shafts does not in any way affect the drive to the spring motor or to the cam 99 (Fig. 22), and consequently the record will be maintained in the same plane and will be repeatedly played until the clutch 128 (Fig. 2) is again brought into operative position.

The record change mechanism, which has been heretofore described, may also be utilized to cause the playing of any record to be discontinued and to cause the reproducer to be lifted and the tone arm 154 to be swung out of playing position and a new record to be deposited on the turntable. This result is brought about by rotating the record change control button 123 (Fig. 1) which acts to hold the finger 106 (Fig. 22) out of the notch 107 and to close the switch 109, thus causing rotation of the shaft 7, which is transmitted through mechanisms (Fig. 25) heretofore described to lift the reproducer and to effect a record changing operation.

Regulation of the volume of sound emanating from the amplifier 2 (Fig. 2) is effected by changing the angular position of the modulator valve 244 (Fig. 11), and this change in angular position of said modulator valve is effected by rotation of the modulator control button 255, which rotation is transmitted through connections 246, 251, 248, 249 and 250 to the shaft 245 on which said modulator valve is mounted.

Upon the completion of the playing of the records in the record magazine 203 (Fig. 1), it is desirable that the record lift mechanism be set into operation to raise said records into position where they may be removed from the turntable and also to bring said turntable into such position that the playing of a new supply of records may be instituted. This record lift mechanism is set in operation through rotation of the record lift control button 333, the tone arm 154 and the reproducer 165 first having been manually swung out of the way of the turntable and records and locked in such position by the engagement of the step portion 363 (Fig. 30) of the lever 361 under the bracket 364 on the tone arm. The actuation of said control button 333 acts to bring the spring 360 into position beneath said lever 361 and consequently resiliently hold said lever in locking position and thereby maintain the tone arm out of the way of the records which are being moved vertically upward. Actuation of the control button 333 also acts to release the clutch 128 (Fig. 2) through the connecting link or rod 140 (Fig. 12). Also connected with the control button mechanism is the rotatable portion 175 (Figs. 25 and 27) on the connecting rod 146, and said portion is rotated by the actuation of the control button to swing the adjusting set screw 177 out of the way so that the same is not contacted by the extension 179 on the lever 149 nor by the plate 178 thereon. This allows the set screws 327 and 328 to be contacted by said lever 149 when the tone arm is swung manually to one side, and the motion of said tone arm is transmitted through said set screws and said lever to the bar 318 which acts through the set screw 331ª (Fig. 11) thereon to contact the projection 112 on the bell crank lever 104 to thus close the switch 109 and set the electric motor 23 in operation. This movement of the bar 318 also acts to allow the spring 330 (Fig. 23) to move a clutch disengaging finger 329 into position to disengage the clutch 101 and consequently disconnect the drive to the cam 99. The drive from the electric motor 23 (Fig. 11) is transmitted through the shaft 28 and the worm 300 thereon to the shaft 303 and through the gear 306 on the lower end of said shaft 303 to the gear 307 which acts to rotate the screw 12, and the rotation of said screw 12 relative to the gear 13 (Fig. 13, see also Fig. 2) of course causes an upward movement of the plate 22 and the mechanism supported thereon, as well as the turntable 67 and the records which have been deposited thereon. During this record lifting operation the shaft 8 and consequently the shafts 7 and 9 are positively locked from rotation by the engagement of the locking finger 348 (Fig. 12) in the notch 349 in the collar secured to the upper end of said shaft 8, and the record lift control mechanism is locked from being manually released by the engagement of the spring 342 over the lever 346 on the shaft 338. When the record lifting operation is completed, said spring 342 is of course released by the contact of the plate 22 therewith, and the spring 360 (Fig. 14) is also released by the contact of the set screw 365 (Fig. 30) with the portion 367 on the lever 363, and as a result of these releasing operations the tone arm 154 is allowed to swing inwardly and at the same time the bar 318 (Fig. 11) is moved into such position that the switch 109 is opened, the clutch disengaging finger 329 still remaining in operative position. Thus upon completion of the record changing operation the switch 109 is left in open position so that the spring motor is the only power mechanism connected and said spring motor will run down and there will be no further motion of the mechanism until it is again desired to start the playing operation, which may of course be effected by returning the record lift control button to normal position and again actuating the record change control button to institute the playing operation as heretofore described. Of course, at the end of the record lifting operation the records are preferably lifted from the turntable and again placed in the record magazine on the record supporting disks, or are placed in a suitable storage container and new records placed in the record magazine.

The machine may be used as an ordinary single record talking machine by removing the record magazine and the record supporting disk, which is possible since the shafts 180, 201 and 202 (Fig. 1) are removably connected to the shafts 7, 8 and 9 (Fig. 2). When this has been accomplished the repeat control button 139 (Fig. 1) is rotated to disconnect the clutch 128 (Fig. 2) and the rotation of the turntable is controlled by the manual stop controlling mechanism 298 (Fig. 3). In cases when the mechanism is operated as a single record machine, the tone arm is swung back into beginning position automatically in the usual manner and the reproducer 165 is lifted automatically, the records being manually changed while the tone arm is swung out of the way. This single record operation may be effected with records of either large or small diameter, it only being necessary to properly position the stop plate, which may be conveniently accomplished by inserting a suitable tool through the top board 6 around the upper end of the shaft 7 to actuate the lever 193 (Fig. 9).

It will thus be apparent that this invention provides an improved automatic or self-operating talking machine wherein a plurality of records may be successively played, and wherein the playing operation may be manually controlled to comply with the desires of the audience.

The provision of primary and secondary power mechanisms makes possible the use of the quiet spring motor during the time which the record is playing and the objectionable feature of the humming of the electric motor caused by its operating during the record playing operation is eliminated. This spring motor also drives the turntable at a much more constant speed than could be accomplished with an electric motor. Such a constant speed of turntable rotation is of course desirable in order that the best musical effects may be produced. At the same time the more powerful electric motor is utilized for the record changing operation and for winding the spring motor, all of these operations being automatic.

The provision of the record lift mechanism affords convenient means whereby the record may be lifted into position for convenient removal and whereby the turntable may be properly positioned for again instituting a playing operation. The master record supporting disk controlling mechanism affords means whereby the tone arm and reproducer are automatically positioned at the proper place to begin the playing of the records of varying diameters, irrespective of the position of these records in the record magazine.

The mechanism as a whole comprises a compact unit which may be conveniently installed in cabinets of various types and on account of the various interlocking features which have been described in detail in the specification, there is no danger of any injury to any of the mechanisms on account of improper manipulation of the control buttons.

I am aware that numerous details of construction may be varied through a wide range without departing from the principles of this invention, and I therefore do not purpose limiting the patent granted otherwise than necessitated by the prior art.

I claim as my invention:

1. A self-operating talking machine including in combination, a record-playing mechanism, a record-changing mechanism, a source of power for the record-playing mechanism, and a separate source of power for the record-changing mechanism adapted to energize the first-mentioned source of power and a mechanically operated clutch connecting said mechanisms.

2. A self-operating talking machine including in combination, a record-playing mechanism, a record-changing mechanism, a source of power for the record-playing mechanism, and a separate source of power for the record-changing mechanism adapted to automatically energize the first-mentioned source of power during the record-changing operation and a mechanically operated clutch connecting said mechanisms.

3. A self-operating talking machine including in combination, a record-playing mechanism, a record-changing mechanism, a source of power for the record-playing mechanism, a separate source of power for the record-changing mechanism adapted to energize the first-mentioned source of power, and means for automatically disconnecting said power sources upon the energization of the first-mentioned power source to a predetermined degree.

4. A self-operating talking machine including in combination, a record-playing mechanism, a record-changing mechanism, a source of power for the record-playing mechanism, a separate source of power for the record-changing mechanism adapted to energize the first-mentioned source of power, and manually controlled means for discontinuing operation of the record-playing mechanism, setting the record-changing mechanism in operation and connecting said power sources.

5. A self-operating talking machine including in combination, a record-playing mechanism, a record-changing mechanism, a spring motor for operating the record-playing mechanism, separate power means for winding the spring motor and operating the record-changing mechanism and a positive releasable clutch connection between the power means and spring motor.

6. A self-operating talking machine including in combination, a record-playing mechanism, a record-changing mechanism, a spring motor for operating the record-playing mechanism, power means for winding the spring motor and operating the record-changing mechanism, an automatically releasable clutch between the power means and the spring motor, and means for disconnecting said power means during the playing of a record.

7. A self-operating talking machine including in combination, a record-playing mechanism, a record-changing mechanism, a source of power for the record-playing mechanism, a separate source of power for the record-changing mechanism adapted to energize the first-mentioned source of power, and cam-controlled means for disconnecting said second mentioned power source during the playing of a record.

8. A self-operating talking machine including in combination, a record-playing mechanism, a record-changing mechanism, a cam driven by the first-mentioned mechanism, and a stop mechanism controlled by said cam for discontinuing the operation of the record-playing mechanism and initiating the operation of the record changing mechanism.

9. A self-operating talking machine including in combination, a record-playing mechanism, a record-changing mechanism, a spring motor for operating the record-playing mechanism, an electric motor for winding the spring motor and for driving the record-changing mechanism and a positive clutch connection between the spring motor and the electric motor.

10. A self-operating talking machine including in combination, a record-playing mechanism, a record-changing mechanism, a spring motor for operating the record-playing mechanism, an electric motor for winding the spring motor and driving the record-changing mechanism, and a cam-controlled switch for cutting the electric motor out of operation during the playing of a record.

11. A self-operating talking machine including in combination, a record-playing mechanism, a record-changing mechanism, a source of power for the record-playing mechanism, a separate source of power for the record-changing mechanism, and cam-controlled means for disconnecting said second-mentioned power source and locking the record-changing mechanism from operation during the playing of a record.

12. A self-operating talking machine comprising a record-playing mechanism, a source of power for operating the same, a record-changing mechanism, a separate source of power therefor, a releasable clutch connection between said mechanisms, and a mechanism driven from the record-playing mechanism for automatically controlling the record-changing mechanism.

13. A self-operating talking machine comprising a record-playing mechanism, a source of power for operating the same, a record-changing mechanism, power means for operating said mechanism, an automatic clutch connection between said mechanisms, and a mechanism driven from the record-playing mechanism for automatically controlling the record-changing mechanism.

14. In a self-operating talking machine, a record-playing mechanism including a record turntable, a record magazine above the turntable containing a plurality of superposed records of two different diameters indiscriminately arranged, means for singly discharging said records from the magazine to the record turntable, and means associated with the discharging means for automatically positioning the record-playing mechanism in the proper position to begin playing the record on the turntable.

15. In a self-operating talking machine, a record-playing mechanism including a record turntable, a record magazine above the turntable containing a plurality of superposed records of two different diameters indiscriminately arranged, means for singly discharging said records from the magazine to the record turntable, means associated with the discharging means for automatically positioning the record-playing mechanism in the proper position to begin playing the record on the turntable, and means for automatically lowering the turntable a predetermined distance during the record-discharging and positioning operation.

16. In a self-operating talking machine, a record-playing mechanism including a record turntable, a record magazine above the turntable containing a plurality of records of two different diameters indiscriminately arranged, means for singly discharging said records from the magazine to the record turntable, and means for automatically positioning the record playing mechanism in the proper position to begin playing the record on the turntable.

17. In a self-operating talking machine, a rotatable turntable, a reproducing mechanism movable thereover, a record magazine positioned over said turntable, axially aligned therewith and containing records of different diameters, a mechanism for transferring the records in the record magazine successively to playing position on the turntable, a mechanism for moving the reproducing mechanism away from the turntable during the time that a new record is being transferred thereto, and means associated with said last-mentioned mechanism for returning the reproducing mechanism through varying distances into the proper position to begin playing the record on the turntable.

18. In a self-operating talking machine, a rotatable turntable, a reproducing mechanism movable thereover, a record magazine positioned over said turntable, axially aligned therewith and containing records of different diameters, a mechanism for transferring the records in the record magazine successively to playing position on the turntable, a mechanism for moving the reproducing mechanism away from the turntable during the time that a new record is being transferred thereto, and means associated with said last-mentioned mechanism and controlled by the record-transferring mechanism for returning the reproducing mechanism through varying distances into the proper position to begin playing the record on the turntable.

19. In a self-operating talking machine, a rotatable turntable, a reproducing mechanism, a mechanism comprising rotatable means for supporting a plurality of records of different diameters above the turntable and adapted to transfer said records successively into playing position on the turntable, and means for automatically positioning the reproducing mechanism in the proper position to institute the playing of a record irrespective of the diameter thereof.

20. In a self-operating talking machine, a rotatable turntable, a reproducing mechanism, a mechanism comprising rotatable means for supporting a plurality of records of different diameter above the turntable and adapted to transfer said records successively to playing position on the turntable, means for controlling the reproducing mechanism during the record-transferring and playing operation, and a cam-controlled mechanism operated in timed relation with the record turntable for setting said rotatable mechanism in operation.

21. In a self-operating talking machine, a record changing mechanism, a record playing mechanism, a motor for operating the changing mechanism, a spring motor for operating the playing mechanism wound by the first mentioned motor, and means directly controlled by the position of the spring for connecting and disconnecting said motors.

22. In a self-operating talking machine, a record-playing mechanism comprising a turntable, a record magazine, a record-changing mechanism adapted to transfer records successively from the record magazine and superpose them on said turntable, a mechanism for raising the turntable and records after the records in the magazine have been played, and means for locking portions of the record-changing and record-playing mechanism from operation while said raising mechanism is operating.

23. In a self-operating talking machine, a record-playing mechanism comprising a turntable, a record magazine, a record-changing mechanism adapted to transfer records successively from the record magazine to the record-playing mechanism, a mechanism for raising the turntable and records, means for locking portions of the record-changing and record-playing mechanism from operation while said raising mechanism is operating, and automatic means for releasing said locking means after the records have been lifted to a predetermined height.

24. In a self-operating talking machine, a record-playing mechanism comprising a turntable, a record magazine, a record-changing mechanism adapted to transfer records successively from the magazine to the record-playing mechanism, a mechanism for raising the turntable and records, means for locking portions of the record-changing and record-playing mechanism from operation while said raising mechanism is operating, and means for automatically releasing said locking means and stopping the raising mechanism after the records have been lifted to a predetermined height.

25. A self-operating talking machine comprising a record-playing mechanism, a record-changing mechanism, a cam operable from the playing mechanism for controlling the record-changing mechanism, and a stop mechanism operated by said cam.

26. A self-operating talking machine comprising a record-playing mechanism, a record-changing mechanism, a cam operable from the playing mechanism for controlling the record-changing mechanism, a normally ineffective stop mechanism operated by said cam, and means adapted to render said stop mechanism effective after a predetermined number of records have been played.

27. A self-operating talking machine comprising a record playing mechanism, a record-changing mechanism, a cam operable from the playing mechanism for controlling the record changing mechanism, a normally ineffective stop mechanism operated by said cam, and vertically adjustable means adapted to render said stop mechanism effective to stop the playing mechanism and leave the record-changing mechanism in inoperative position after a predetermined number of records have been played.

28. In a self-operating talking machine, a record-playing mechanism including a rotatable turntable, means above the turntable adapted to support a plurality of records of different diameters, a mechanism for rotating said means to effect the discharge of a record therefrom, and means associated with said means for preventing the discharge of a record of one diameter while a record of another diameter is being discharged.

29. In a self-operating talking machine, a record-playing mechanism including a rotatable turntable, means above the turntable adapted to support a plurality of records of different diameters, a mechanism for rotating said means to effect the successive discharge of records therefrom, and a mechanism controlled from said record supporting means for properly positioning the record playing mechanism at each record-changing operation.

30. In a self-operating talking machine, a rotatable turntable, a record magazine, means for successively transferring records from the record magazine to the turntable, a reproducing mechanism which is advanced while playing a record solely by engagement with the grooves therein, means for automatically moving said reproducing mechanism away from the turntable while a record is being transferred thereto, and means controlled from the record magazine for returning said reproducing mechanism through varying distances to properly position the same to begin the playing of records of different diameters.

31. In a self-operating talking machine, a record-playing mechanism including a swinging tone arm, a record-changing mechanism, a record-lifting mechanism, and separate connections for the record-changing mechanism and the record-lifting mechanism to the swinging tone arm.

32. In a self-operating talking machine, a record-playing mechanism including a swinging tone arm, a record-changing mechanism, a record-lifting mechanism, a connection from the record-changing mechanism to the tone arm, a connection from the record-lifting mechanism to the tone arm, and means for moving the connection between the tone arm and the record-changing mechanism out of operative position when the record-lifting mechanism is set in operation.

33. In a self-operating talking machine, a record-playing mechanism, a record-changing mechanism, a record-lifting mechanism, a drive for said mechanisms, and means for disconnecting the drive to the record-changing mechanism when the record lifting mechanism is set in operation.

34. In a self-operating talking machine, a rotatable turntable, a reproducing mechanism movable thereover, a record magazine positioned over said turntable in a plane substantially parallel thereto and containing records of different diameters, a mechanism for transferring the records in the record magazine successively to playing position on the turntable, a mechanism for moving the reproducing mechanism away from the turntable during the time that the record is being transferred thereto, and means associated with the last mentioned mechanism for returning the reproducing mechanism through varying distances into the proper position to begin playing the record on the turntable.

35. In a self-operating talking machine, a rotatable turntable, a reproducing mechanism movable thereover, a record magazine positioned over said turntable in a plane substantially parallel thereto and containing records of different diameters, a mechanism for transferring the records in the record magazine successively to playing position on the playing turntable, mechanism for moving the reproducing mechanism away from the turntable during the time that a new record is being transferred thereto and means associated with the last mentioned means and controlled by the record transferring mechanism for returning the reproducing mechanism through varying distances into proper position to begin playing the record on the turntable.

36. In a self operating talking machine, a record playing mechanism including a tone arm, a record changing mechanism including record lifting means, a connection between the record changing mechanism and the tone arm and driving means for said mechanisms and said connection including a crank operated lever for causing a swinging movement to be imparted to said tone arm to move it out of coöperation with the record played during the record changing operation.

37. In a self operating talking machine, a record playing mechanism including a turn table and coöperable swinging tone arm, record changing mechanism adapted to automatically and successively deliver records to said playing mechanism, a spring motor for operating the turn table, means for actuating said mechanisms including an electric motor and a crank operated lever, said electric motor being connected to said spring motor for winding it when said turn table is not being actuated and switch means for automatically cutting the electric motor out of operation during the playing of a record.

38. In a self-operating talking machine, a record playing mechanism including a swinging tone arm, a record changing mechanism, a record lifting mechanism and mechanism connected to said tone arm for swinging the same out of playing position and for operating said record lifting mechanism, said later mechanism including means for arresting operation of said playing mechanism during the operation of said record lifting mechanism.

In testimony whereof I have hereunto subscribed my name.

JAMES H. BENJAMIN.